United States Patent
Kunihiro et al.

(10) Patent No.: US 9,873,757 B2
(45) Date of Patent: Jan. 23, 2018

(54) POLYESTER POLYOL, COMPOSITION FOR POLYURETHANE, COMPOSITION FOR POLYURETHANE FOAM, POLYURETHANE RESIN, AND POLYURETHANE FOAM

(71) Applicant: Mitsui Chemicals, Inc., Minato-ku, Tokyo (JP)

(72) Inventors: Tamotsu Kunihiro, Kisarazu (JP); Atsushi Miyata, Ichihara (JP); Tomoki Tsutsui, Chiba (JP); Shinsuke Matsumoto, Ichihara (JP); Kanae Morishita, Ichihara (JP)

(73) Assignee: MITSUI CHEMICALS & SKC POLYURETHANES INC., Tokyo (JP)

( * ) Notice: Subject to any disclaimer, the term of this patent is extended or adjusted under 35 U.S.C. 154(b) by 0 days.

(21) Appl. No.: 14/685,338

(22) Filed: Apr. 13, 2015

(65) Prior Publication Data

US 2015/0218301 A1 Aug. 6, 2015

Related U.S. Application Data

(62) Division of application No. 13/055,999, filed as application No. PCT/JP2009/063423 on Jul. 28, 2009.

(30) Foreign Application Priority Data

Jul. 30, 2008 (JP) ................................. 2008-196479

(51) Int. Cl.
| | |
|---|---|
| C08G 18/42 | (2006.01) |
| C08G 18/36 | (2006.01) |
| C08G 18/40 | (2006.01) |
| C08G 18/48 | (2006.01) |
| C08G 18/63 | (2006.01) |
| C08G 63/06 | (2006.01) |
| C08G 63/60 | (2006.01) |
| C08J 9/12 | (2006.01) |
| C08G 18/72 | (2006.01) |
| C08G 101/00 | (2006.01) |

(52) U.S. Cl.
CPC ......... *C08G 18/36* (2013.01); *C08G 18/4072* (2013.01); *C08G 18/4266* (2013.01); *C08G 18/4288* (2013.01); *C08G 18/4841* (2013.01); *C08G 18/632* (2013.01); *C08G 18/72* (2013.01); *C08G 63/06* (2013.01); *C08G 63/60* (2013.01); *C08J 9/12* (2013.01); *C08G 2101/0008* (2013.01); *C08G 2101/0083* (2013.01); *C08J 2375/06* (2013.01)

(58) Field of Classification Search
CPC . C08G 18/4288; C08G 18/4266; C08G 18/36
See application file for complete search history.

(56) References Cited

U.S. PATENT DOCUMENTS

| | | | |
|---|---|---|---|
| 2,787,601 | A | 4/1957 | Detrick et al. |
| 4,609,682 | A | 9/1986 | Weber et al. |
| 6,207,794 | B1 | 3/2001 | Yamasaki et al. |
| 6,410,676 | B1 | 6/2002 | Yamasaki et al. |
| 6,433,033 | B1 | 8/2002 | Isobe et al. |
| 2009/0127915 | A1 | 5/2009 | Nozawa et al. |
| 2009/0143495 | A1 | 6/2009 | Nozawa et al. |
| 2009/0264546 | A1 | 10/2009 | Lysenko et al. |

FOREIGN PATENT DOCUMENTS

| | | |
|---|---|---|
| EP | 2 143 747 A1 | 1/2010 |
| JP | 61-091216 | 5/1986 |
| JP | 05-059144 A | 3/1993 |
| JP | H11-050086 A | 2/1999 |
| JP | 11-106500 | 4/1999 |
| JP | 11-166155 | 6/1999 |
| JP | 2000-297131 | 10/2000 |
| JP | 2001-106780 | 4/2001 |
| JP | 2003-342345 A | 12/2003 |
| JP | 2006-104404 A | 4/2006 |
| JP | 2007-308658 | 11/2007 |
| JP | 2009-203365 | 9/2009 |
| WO | WO-01/16346 A1 | 3/2001 |
| WO | WO-2006/118995 A1 | 11/2006 |

(Continued)

OTHER PUBLICATIONS

"Poriuretan Jushi Handobukku", edited by Iwata Keiji, the first impression, Nikkan Kogyo Shimbun Ltd., 1987, pp. 71-98.
Extended European Search Report dated Dec. 4, 2014 issued in Application No. 09802953.1.
Indian Office Action dated Oct. 30, 2014 issued in Application No. 611/DELNP/2011.
International Search Report in PCT/JP2009/063423 dated Oct. 27, 2009.
Nobutaka, et al. "Poriuretan", the eighth impression, Maki Shyoten, 1964, pp. 41-45 and 134-137.
Paul J. Flory, "Principles of Polymer Chemistry", Cornell University Press, 1953, pp. 576-589.

(Continued)

*Primary Examiner* — Michael L Leonard
(74) *Attorney, Agent, or Firm* — Foley & Lardner LLP

(57) ABSTRACT

The present invention provides a polyester polyol, preferably a plant-derived polyester polyol, suitable for a composition for polyurethane foam that contributes to the reduction of load on the environment and has a good balance of high resilience, moderate hardness, and high durability as a cushioning material for vehicle seat cushions. A polyester polyol having a hydroxyl value in the range of 15 to 100 mgKOH/g according to the present invention is produced by a condensation of raw materials comprising at least one selected from the group consisting of fatty acids having a hydroxy group and fatty acid esters having a hydroxy group with a polyhydric alcohol having an average number of functional groups of more than three but not more than eight. The raw materials contain 90% to 100% by mass of a fatty acid having a hydroxy group and a fatty acid ester having a hydroxy group in total.

18 Claims, No Drawings

(56) References Cited

FOREIGN PATENT DOCUMENTS

WO     WO-2007/020904 A1     2/2007
WO     WO-2007/020905 A1     2/2007

OTHER PUBLICATIONS

Takayuki, Otsu—"Kaitei Kobunshi Gosei no Kagaku", the first impression of the second edition, Kagaku-Dojin Publishing Company, Inc., 1989, pp. 172-181.

Usaka, et al. "A Raw Materials System Concept for wider Ranging Demands of Flexible Polyurethane Molded Foam", Polyurethanes EXP, 2002, pp. 75-82.

Raj et al., "Effect of process parameters on 3-hydroxypropionic acid production from glycerol using a recombinant *Escherichia coli*", Appl Microbiol Biotechnol, 84:649-657, Apr. 2009.

POLYESTER POLYOL, COMPOSITION FOR POLYURETHANE, COMPOSITION FOR POLYURETHANE FOAM, POLYURETHANE RESIN, AND POLYURETHANE FOAM

CROSS REFERENCE TO RELATED APPLICATIONS

This application is a divisional of and claims priority to U.S. application Ser. No. 13/055,999, filed Jan. 26, 2011 which is a National Stage entry of PCT/JP2009/063423, filed Jul. 28, 2009, the disclosures of which are hereby incorporated by reference in their entirety.

TECHNICAL FIELD

The present invention relates to a polyester polyol, a composition for polyurethane, a composition for polyurethane foam, a polyurethane resin, and a polyurethane foam.

More particularly, the present invention relates to a composition for polyurethane foam derived from castor oil for use in applications, such as cushioning materials for vehicle seat cushions, a polyester polyol derived from castor oil suitable for the composition, a polyurethane resin, and a polyurethane foam, and applications thereof. The composition can provide a polyurethane foam having a good balance of high rebound resilience, moderate hardness, and high durability.

BACKGROUND ART

Polyurethane foam, which is one of resin components, has been widely used in seat cushions of vehicles, such as automobiles, because of its excellent cushioning characteristics. In particular, cushions having high rebound resilience can provide an ideal body pressure distribution and are very comfortable to sit on. Thus, there is a great demand for such cushions. Seat cushions are required to have moderate hardness, neither too firm nor too soft, and high durability for long-term use with small variations in elasticity, hardness, and thickness.

From the recent perspective of the reduction of load on the environment, there is a demand for plant-derived resins produced from plant resources to take the place of petroleum-derived resins produced from petroleum resources.

Plant-derived resins are produced from raw materials derived from plants, which grow while consuming $CO_2$ in the air by photosynthesis. $CO_2$ emitted into the atmosphere by the combustion of used plant-derived resins therefore does not increase the amount of $CO_2$ in the air. This is called carbon neutrality. Thus, plant-derived resins are receiving attention as materials that contribute to the reduction of load on the environment.

To meet the demand for plant-derived resins, plant-derived castor oil polyols have been used as raw material polyol components in polyurethane foam to reduce environmental load (see, for example, Patent Literatures 1 to 4). However, these foams cannot satisfy the physical properties required by the market, that is, a good balance of moderate hardness and rebound resilience and high durability.

Patent Literature 5 discloses a foam produced from a polyester polyol produced by the condensation of 12-hydroxystearic acid derived from castor oil. However, the foam according to Patent Literature 5 has rebound resilience as low as approximately 50% and cannot provide polyurethane foam having high rebound resilience as a cushioning material for vehicle seat cushions.

Patent Literature 6 discloses a polyurethane foam having a good balance of moderate hardness and rebound resilience and high durability as a cushioning material for vehicle seat cushions. The polyurethane foam is produced from a plant-derived composition for polyurethane foam containing a plant-derived polyol and a low-monool-content polyol in combination.

The polyurethane foam according to Patent Literature 6, however, contains a low amount of plant-derived polyol. Thus, there is still room for improvement in the reduction of load on the environment, as well as improvement in rebound resilience.

CITATION LIST

Patent Literature

PTL 1: U.S. Pat. No. 2,787,601
PTL 2: Japanese Unexamined Patent Application Publication No. 5-59144
PTL 3: Japanese Unexamined Patent Application Publication No. 61-91216
PTL 4: Japanese Unexamined Patent Application Publication No. 11-166155
PTL 5: WO 2006/118995 A1
PTL 6: WO 2007/020904 A1

SUMMARY OF INVENTION

Technical Problem

It is an object of the present invention to solve the problems associated with related art as described above and provide a composition, preferably a plant-derived composition, for a polyurethane foam or polyurethane resin having a good balance of high resilience, moderate hardness, and high durability as a cushioning material for vehicle seat cushions and contributing to the reduction of load on the environment, and a (plant-derived) polyurethane resin or polyurethane foam having such physical properties.

Solution to Problem

As a result of diligent research to solve the problems described above, the present inventors completed the present invention by finding that a polyurethane foam produced from a composition for polyurethane foam comprising a particular polyester polyol (A) contributes to the reduction of load on the environment and has a good balance of high rebound resilience, moderate hardness, and high durability as a cushioning material for vehicle seat cushions.

For example, the present invention includes the following aspects [1] to [12].

[1] A polyester polyol (A) according to the present invention is produced by the condensation of raw materials that comprise at least one selected from the group consisting of fatty acids having a hydroxy group and fatty acid esters having a hydroxy group with a polyhydric alcohol having an average number of functional groups of more than three but not more than eight. The polyester polyol (A) has a hydroxyl value in the range of 15 to 100 mgKOH/g. The raw materials comprise 90% to 100% by mass of a fatty acid having a hydroxy group and a fatty acid ester having a hydroxy group in total.

[2] A polyester polyol (A) according to the present invention is produced by the condensation of raw materials that comprise at least one selected from the group consisting of fatty acids having a hydroxy group and fatty acid esters having a hydroxy group with a polyhydric alcohol having an average number of functional groups of more than three but not more than eight. The polyester polyol (A) has a hydroxyl value in the range of 15 to 100 mgKOH/g. The raw materials comprise 90% to 100% by mass of the following (I), (II), or (III):

(I) one type of fatty acid having a hydroxy group,
(II) one type of fatty acid ester having a hydroxy group, and
(III) a mixture of (i) one type of fatty acid having a hydroxy group and an ester derived from (i) the one type of fatty acid having a hydroxy group.

[3] Preferably, the at least one selected from the group consisting of fatty acids having a hydroxy group and fatty acid esters having a hydroxy group has a carbon-carbon double bond.

[4] Preferably, the at least one selected from the group consisting of fatty acids having a hydroxy group and fatty acid esters having a hydroxy group is derived from castor oil. Preferably, the (I), (II), or (III) is derived from castor oil.

[5] Preferably, the fatty acid having a hydroxy group is ricinoleic acid, and the fatty acid ester having a hydroxy group is a ricinoleate.

Preferably, the (I), (II), or (III) accounts for 50% by mole or more based on 100% by mole of the fatty acid having a hydroxy group and the fatty acid ester having a hydroxy group in total in the raw materials.

[6] Preferably, the mass ratio of the polyhydric alcohol to the total amount of the fatty acid having a hydroxy group and the fatty acid ester having a hydroxy group ranges from 1:1 to 1:100. Preferably, the mass ratio of the polyhydric alcohol to the (I), (II), or (III) ranges from 1:1 to 1:100.

[7] A composition for polyurethane according to the present invention comprises a polyol (P) containing the polyester polyol (A), a catalyst, and a polyisocyanate. The polyester polyol (A) accounts for 10% to 95% by mass of the polyol (P).

[8] A composition for polyurethane foam according to the present invention comprises the composition for polyurethane, a foam stabilizer, and a blowing agent.

[9] Preferably, the polyol (P) in the composition for polyurethane further comprises a low-monool-content polyol (B) having a total degree of unsaturation of 0.035 meq/g or less.

[10] Preferably, the polyol (P) in the composition for polyurethane foam further comprises a low-monool-content polyol (B) having a total degree of unsaturation of 0.035 meq/g or less.

[11] A polyurethane resin according to the present invention is produced by the reaction of the composition for polyurethane.

[12] A polyurethane foam according to the present invention is produced by the reaction of the composition for polyurethane foam.

Advantageous Effects of Invention

The present invention can provide a composition, preferably a plant-derived composition, for polyurethane foam or polyurethane resin having a good balance of high rebound resilience, moderate hardness, and high durability, and a (plant-derived) polyurethane foam or polyurethane resin having such physical properties.

Furthermore, in the present invention, a polyurethane foam or polyurethane resin produced from a plant (castor oil)-derived polyester polyol can contribute to the reduction of load on the environment, complying with the recent social trends toward global environmental conservation.

DESCRIPTION OF EMBODIMENTS

Composition for Polyurethane

A composition for polyurethane according to the present invention comprises a polyol (P) comprising a particular polyester polyol (A), a catalyst, and a polyisocyanate. The particular polyester polyol (A) accounts for 10% to 95% by mass of the polyol (P). Preferably, the composition optionally comprises a foam stabilizer, a blowing agent, a cross-linker, and other aids. Preferably, the polyol (P) optionally further comprises another polyol, such as a low-monool-content polyol (B) having a total degree of unsaturation of 0.035 meq/g or less. A composition for polyurethane foam according to the present invention comprises a composition for polyurethane according to the present invention, a foam stabilizer, a blowing agent, and optionally a low-monool-content polyol (B).

(P) Polyol

A polyol (P) used in the present invention comprises a particular polyester polyol (A) and optionally a low-monool-content polyol (B) and another polyol, such as a polymer-dispersed polyol.

The polyol (P) comprises 10% to 95% by mass, preferably 20% to 95% by mass, more preferably 25% to 90% by mass, most preferably 51% to 90% by mass, of a polyester polyol (A) according to the present invention, based on 100% by mass of all components of the polyol (P). When the polyol (P) contains less than 10% by mass of the polyester polyol (A), polyester polyols synthesized using a high-purity castor oil fatty acid have unfavorably little advantages over polyester polyols produced from a normal-purity castor oil fatty acid. A polyol (P) containing more than 95% by mass of the polyester polyol (A) unfavorably results in poor formability. 51% by mass or more of the polyester polyol (A) can provide a more environmentally-friendly polyurethane foam or polyurethane resin.

The following is a detailed description.

(A) Polyester Polyol

A polyester polyol (A) having a hydroxyl value in the range of 15 to 100 mgKOH/g according to the present invention is produced by a condensation of raw materials containing at least one selected from the group consisting of fatty acids having a hydroxy group and fatty acid esters having a hydroxy group with a polyhydric alcohol having an average number of functional groups of more than three but not more than eight. The raw materials contain 90% to 100% by mass, preferably 95% to 100% by mass, more preferably 97% to 100% by mass, of a fatty acid having a hydroxy group and a fatty acid ester having a hydroxy group in total. When the raw materials comprise 90% by mass or more of a fatty acid having a hydroxy group and a fatty acid ester having a hydroxy group in total, the resulting polyurethane resin or polyurethane foam can have a good balance of high rebound resilience, moderate hardness, and high durability. In particular, a higher concentration of a fatty acid having a hydroxy group and a fatty acid ester having a hydroxy group in the raw materials can result in higher rebound resilience of the resulting polyurethane resin or polyurethane foam.

A polyester polyol (A) having a hydroxyl value in the range of 15 to 100 mgKOH/g according to the present invention is produced by the condensation of raw materials that comprise at least one selected from the group consisting of fatty acids having a hydroxy group and fatty acid esters having a hydroxy group with a polyhydric alcohol having an average number of functional groups of more than three but not more than eight. The raw materials comprise 90% to 100% by mass of the following (I), (II), or (III):

(I) one type of fatty acid having a hydroxy group, (II) one type of fatty acid ester having a hydroxy group, and (III) a mixture of (i) one type of fatty acid having a hydroxy group and an ester derived from (i) the one type of fatty acid having a hydroxy group.

In the term "(I) one type of fatty acid having a hydroxy group" ("one type of" used herein may also be referred to as "a single-component"), the optical isomers and cis-trans isomers of the fatty acid are not discriminated and are collectively referred to as "(I) one type of fatty acid having a hydroxy group" as a single-component fatty acid.

Likewise, the term "(II) one type of fatty acid ester having a hydroxy group" includes the optical isomers and cis-trans isomers of the fatty acid ester. Alcohol-derived functional groups in the ester do not contribute to the physical properties of the polyol (A) and are therefore not particularly limited. These compounds are collectively referred to as "(II) one type of fatty acid ester having a hydroxy group" as a single-component fatty acid ester. As an example of "(II) one type of fatty acid ester having a hydroxy group", a mixture of methyl ricinoleate and ethyl ricinoleate is referred to as one type of ricinoleate ((II) one type of fatty acid ester having a hydroxy group).

In (III) (i) one type of fatty acid having a hydroxy group and an ester derived from (i) the one type of fatty acid having a hydroxy group, when (i) one type of fatty acid having a hydroxy group is ricinoleic acid, the ester derived from (i) the one type of fatty acid having a hydroxy group refers to a ricinoleate. The aspect (III) means that the raw materials contain 90% to 100% by mass of the mixture (for example, ricinoleic acid and a ricinoleate). The term "one type of" in (III) a mixture of (i) one type of fatty acid having a hydroxy group and an ester derived from (i) the one type of fatty acid having a hydroxy group has the same meaning as described above.

Examples of the fatty acid having a hydroxy group include ricinoleic acid, 12-hydroxystearic acid, cerebronic acid, and hydroxyundecanoic acid. Among these, ricinoleic acid and 12-hydroxystearic acid derived from castor oil can contribute to the reduction of load on the environment and are preferred. Examples of the fatty acid ester having a hydroxy group include esters of the fatty acids described above: ricinoleates, such as methyl ricinoleate, ethyl ricinoleate, propyl ricinoleate, and butyl ricinoleate, 12-hydroxystearates, such as methyl 12-hydroxystearate, ethyl 12-hydroxystearate, propyl 12-hydroxystearate, and butyl 12-hydroxystearate, cerebronic acid esters, such as cerebronic acid methyl ester, cerebronic acid ethyl ester, cerebronic acid propyl ester, and cerebronic acid butyl ester, and hydroxyundecanoic acid esters, such as hydroxyundecanoic acid methyl ester, hydroxyundecanoic acid ethyl ester, hydroxyundecanoic acid propyl ester, and hydroxyundecanoic acid butyl ester. Among these, ricinoleates, such as methyl ricinoleate, ethyl ricinoleate, propyl ricinoleate, and butyl ricinoleate, and 12-hydroxystearates, such as methyl 12-hydroxystearate, ethyl 12-hydroxystearate, propyl 12-hydroxystearate, and butyl 12-hydroxystearate, derived from castor oil can contribute to the reduction of load on the environment and are therefore preferred.

In the present invention, a fatty acid having a hydroxy group and/or a fatty acid ester having a hydroxy group preferably has a carbon-carbon double bond, because the resulting polyester polyol has a low viscosity and is easy to handle in the production of a polyurethane resin or polyurethane foam. While such fatty acids and fatty acid esters are not particularly limited, ricinoleic acid and ricinoleates are preferred, because such fatty acids having a hydroxy group and a larger number of carbon atoms can provide a polyester polyol having a lower viscosity. It is preferable that the total amount of fatty acid having a hydroxy group and a carbon-carbon double bond and/or fatty acid ester having a hydroxy group and a carbon-carbon double bond in the raw materials is 40% by mass or more, preferably 80% by mass or more, because this can reduce the viscosity of a polyol in the production of the polyol. The proportion of a carbon-carbon double bond in at least one type of molecule selected from the group consisting of fatty acids having a hydroxy group and fatty acid esters having a hydroxy group can be calculated from 3E/2D, wherein E denotes the peak area of protons bonded to the carbon-carbon double bond, and D denotes the peak area of protons of a terminal methyl group of an alkyl, as determined by $^1$H-NMR.

In the present invention, the mass ratio of the polyhydric alcohol having an average number of functional groups of more than three but not more than eight described below to the total amount of the fatty acid having a hydroxy group and the fatty acid ester having a hydroxy group generally ranges from 1:1 to 1:100, preferably 1:5 to 1:70, more preferably 1:5 to 1:50. It is difficult to design a desired polyester polyol at a total amount below one part by mass per part by mass of the polyhydric alcohol. On the other hand, the total amount above 100 parts by mass results in an excessively low hydroxyl value of the polyester polyol and low activity in the production of a polyurethane resin or polyurethane foam. This unfavorably causes difficulty in molding.

Fatty Acid Having Hydroxy Group or Fatty Acid Ester Having Hydroxy Group Derived from Castor Oil In the present invention, one selected from fatty acids having a hydroxy group and fatty acid esters having a hydroxy group is preferably derived from castor oil, because it can contribute to the reduction of load on the environment.

The raw materials according to the present invention are preferably a mixture comprising 90% to 100% by mass of a fatty acid having a hydroxy group and/or a fatty acid ester having a hydroxy group produced by the hydrolysis, esterification, and transesterification of castor oil. The hydrolysis, esterification, and transesterification of castor oil may be performed in the same way as described below.

The raw materials according to the present invention preferably comprise 90% to 100% by mass of (I) one type of fatty acid having a hydroxy group derived from castor oil, (II) one type of fatty acid ester having a hydroxy group derived from castor oil, or (III) a mixture of (i) one type of fatty acid having a hydroxy group derived from castor oil and an ester derived from (i) the one type of fatty acid having a hydroxy group, because the resulting polyurethane foam or polyurethane resin can have a better balance of high rebound resilience, moderate hardness, and high durability.

The proportion of these compounds derived from castor oil or a mixture thereof is 50% by mole or more, preferably in the range of 70% to 100% by mole, more preferably 80% to 100% by mole, based on 100% by mole of the fatty acid having a hydroxy group and the fatty acid ester having a hydroxy group in total in the raw materials. 50% by mole or more these compounds derived from castor oil or a mixture thereof can contribute to the reduction of load on the environment and are preferred.

The mass ratio of the polyhydric alcohol having an average number of functional groups of more than three but not more than eight described below to these compounds derived from castor oil or a mixture thereof ranges from 1:1 to 1:100 (the polyhydric alcohol:the compounds or the mixture thereof), preferably 1:5 to 1:70, more preferably 1:5 to 1:50. When the amount of compounds or mixture thereof derived from castor oil is below one part by mass per part by mass of the polyhydric alcohol, it is difficult to design a polyester polyol for use in the production of a desired flexible polyurethane foam. On the other hand, the amount above 100 parts by mass results in an excessively low hydroxyl value of the polyester polyol and low reaction activity in the production of a polyurethane resin and polyurethane foam. This unfavorably causes difficulty in molding.

The raw materials containing a fatty acid having a hydroxy group and a fatty acid ester having a hydroxy group derived from castor oil can be obtained as described below.

(1) Castor oil is hydrolyzed to produce castor oil fatty acid. The castor oil fatty acid is refined to produce a raw material containing 90% to 100% by mass of a fatty acid having a hydroxy group as a single component.

(2) The fatty acid produced in (1) is esterified to produce a raw material containing 90% to 100% by mass of the fatty acid ester.

(3) Castor oil is transesterified with an alcohol to produce castor oil fatty acid ester. The castor oil fatty acid ester is refined to produce a raw material containing 90% to 100% by mass of the fatty acid ester.

In (1) to (3), castor oil and castor oil fatty acid may be replaced with hydrogenated castor oil and hydrogenated castor oil fatty acid, respectively, to produce the raw materials containing 90% to 100% by mass of 12-hydroxystearic acid and 12-hydroxystearate.

In (2) and (3), the esterification of the fatty acid may be any common esterification, for example, esterification of the fatty acid with methanol, ethanol, n-propanol, iso-propanol, n-butanol, or tert-butanol. Such esterification may be performed by a known method, for example, in the presence of an alkaline catalyst.

The raw materials derived from castor oil according to the present invention may be a mixture of (1) and (2) or (3) provided that the raw materials contain 90% to 100% by mass of a single-component fatty acid having a hydroxy group and an ester of the fatty acid in total in the raw materials.

In (1) and (3), the castor oil fatty acid or the castor oil fatty acid ester can be refined by a known method, such as distillation, extraction, or crystallization. Regarding the distillation of castor oil fatty acid, since castor oil fatty acid decomposes at approximately 200° C. and undergoes a side reaction of intramolecular dehydration, castor oil fatty acid is preferably distilled with a thin-film evaporator at a temperature of 180° C. or less. A thin-film distillation apparatus used is, but not limited to, a rotating thin film distillation apparatus or a falling thin film distillation apparatus. In particular, molecular distillation, which employs a rotating thin film distillation apparatus under high vacuum, is preferred in terms of evaporation efficiency.

Regarding the extraction of castor oil fatty acid, an extraction method with a general solvent can be used. While the solvent used is not particularly limited, hexane can be used in consideration of the solubility of castor oil fatty acid and the ease with which the solvent is removed after extraction. Castor oil fatty acid and hexane can be mixed at a predetermined ratio and left to stand at a predetermined temperature to separate a hexane phase and a castor oil fatty acid phase. Hexane dissolved in castor oil fatty acid can be removed to produce a high-purity castor oil fatty acid.

12-hydroxystearic acid can be purified by a widely used crystallization method.

Examples of the fatty acid produced in (1) include ricinoleic acid and 12-hydroxystearic acid.

A fatty acid ester having a hydroxy group in the raw materials derived from castor oil can be produced in (2) or (3).

Examples of the fatty acid ester produced in (2) or (3) include ricinoleates, such as methyl ricinoleate, ethyl ricinoleate, propyl ricinoleate, and butyl ricinoleate, and 12-hydroxystearates, such as methyl 12-hydroxystearate, ethyl 12-hydroxystearate, propyl 12-hydroxystearate, and butyl 12-hydroxystearate.

The proportion of the fatty acid contained in the raw materials derived from castor oil as a single component ranges from 90% to 100% by mass, preferably 95% to 100% by mass, more preferably 97% to 100% by mass. A polyurethane resin or polyurethane foam produced from the raw materials containing high-purity single-component fatty acid derived from castor oil can contribute to the reduction of load on the environment and can have a good balance of very high rebound resilience, moderate hardness, and high durability. A proportion of the fatty acid in the raw materials below 90% by mass results in a large amount of fatty acid having no hydroxy group. Terminal hydroxy groups of the molecular chain of a polyester polyol produced by the condensation of a polyol with the fatty acid therefore are capped with the fatty acid having no hydroxy group. Thus, in the reaction with an isocyanate to produce a polyurethane resin or polyurethane foam, the nonreactive terminals form dangling chains, unfavorably reducing the rebound resilience of the polyurethane resin or polyurethane foam. In contrast, a proportion of the fatty acid in the raw materials in the range of 95% to 100% by mass results in a low proportion of fatty acid having no hydroxy group. A low proportion of hydroxy groups at the molecular ends therefore are capped with the fatty acid having no hydroxy group. Thus, the resulting polyurethane resin or urethane foam has high rebound resilience. Hence, this range is most preferred.

The proportion of a fatty acid having a hydroxy group in the raw materials that contain at least one selected from the group consisting of fatty acids having a hydroxy group and fatty acid esters having a hydroxy group is determined by the ratio A/B, wherein A denotes the hydroxyl value of the fatty acid having a hydroxy group as determined by a method according to JIS K1557-1, and B denotes the acid value of the fatty acid having a hydroxy group as determined by a method according to JIS K1557-5.

The proportion of a fatty acid ester having a hydroxy group in the raw materials that contain at least one selected from the group consisting of fatty acids having a hydroxy group and fatty acid esters having a hydroxy group can be determined by 3C/F in the case of a methyl ester, wherein C denotes the peak area of protons bonded to carbon adjacent to the hydroxy group, and F denotes the peak area of protons bonded to carbon adjacent to the oxygen atoms of the ester group, as determined by $^1$H-NMR. This proportion can be determined by 2C/G for an ester of an alcohol having two or more carbon atoms and a fatty acid having a hydroxy group, wherein C denotes the peak area of protons bonded to carbon adjacent to the hydroxy group, and G denotes the peak area of protons bonded to carbon adjacent to the oxygen atoms of the ester group.

The total amount (purity: %) of fatty acid having a hydroxy group and fatty acid ester having a hydroxy group in the raw materials can be determined by 3C/D, wherein C denotes the peak area of protons bonded to carbon adjacent to the hydroxy group, and D denotes the peak area of protons of a terminal methyl group of an alkyl, as determined by $^1$H-NMR.

The proportion of a mixture of (i) one type of fatty acid having a hydroxy group and an ester derived from (i) the one type of fatty acid having a hydroxy group in the raw materials can also be determined by $^1$H-NMR measurements in the same manner as described above.

When (i) one type of fatty acid having a hydroxy group is difficult to identify by $^1$H-NMR, the quality and quantity of the one type of fatty acid having a hydroxy group can be determined by gas chromatography (GC). The quality and quantity of an ester derived from (i) the one type of fatty acid having a hydroxy group can also be determined by GC.

Among fatty acids having a hydroxy group or fatty acid esters having a hydroxy group thus produced, ricinoleic acid and ricinoleates are preferred because they can reduce the viscosity of a polyol in the production of the polyol.

Other Hydroxycarboxylic Acids and Hydroxycarboxylates

In the present invention, the raw materials that comprise at least one selected from the group consisting of fatty acids having a hydroxy group and fatty acid esters having a hydroxy group may comprise 0% to 10% by mass, preferably 0% to 5% by mass, more preferably 0% to 3% by mass, of an other hydroxycarboxylic acid and/or a hydroxycarboxylate.

The amount of hydroxycarboxylic acid and/or hydroxycarboxylate is preferably less than 50% by mole, more preferably in the range of 0% to 30% by mole, still more preferably 0% to 20% by mole, based on 100% by mole of the fatty acid having a hydroxy group and the fatty acid ester having a hydroxy group in total in the raw materials. Less than 50% by mole of the hydroxycarboxylic acid and/or the hydroxycarboxylate in total is preferred because this can reduce the viscosity of the polyester polyol.

Examples of the hydroxycarboxylic acid include lactic acid, glycolic acid, 2-hydroxybutyric acid, 3-hydroxybutyric acid, and γ-hydroxybutyric acid. Examples of the hydroxycarboxylate include lactate, glycolate, 2-hydroxybutyrate, 3-hydroxybutyrate, and γ-hydroxybutyrate. The esterification may be any common esterification as described above, for example, esterification of the hydroxycarboxylic acid with methanol, ethanol, n-propanol, iso-propanol, n-butanol, or tert-butanol. Such esterification may be performed by a known method, for example, in the presence of an alkaline catalyst.

In the case that lactic acid and/or a lactate is used as the hydroxycarboxylic acid in the present invention, the raw materials can contain 90% to 100% by mass of any of the following (IV) to (XI). In the following (IV) to (XI), "one type of" and "ester" have the same definitions as described above.

(IV) A mixture of one type of fatty acid having a hydroxy group and lactic acid.

(V) A mixture of one type of fatty acid having a hydroxy group and a lactate.

(VI) A mixture of one type of fatty acid ester having a hydroxy group and lactic acid.

(VII) A mixture of one type of fatty acid ester having a hydroxy group and a lactate.

(VIII) A mixture of (i) one type of fatty acid having a hydroxy group, an ester derived from (i) the one type of fatty acid having a hydroxy group, and lactic acid.

(IX) A mixture of (i) one type of fatty acid having a hydroxy group, an ester derived from (i) the one type of fatty acid having a hydroxy group, and a lactate.

(X) A mixture of at least one selected from (i) one type of fatty acid having a hydroxy group, an ester derived from (i) the one type of fatty acid having a hydroxy group, lactic acid and lactates.

(XI) A mixture of at least one selected from a fatty acid having a hydroxy group, a fatty acid ester having a hydroxy group, lactic acid and lactates.

Polyhydric Alcohol Having Average Number of Functional Groups of More than Three but not More than Eight A polyhydric alcohol having an average number of functional groups of more than three but not more than eight according to the present invention used together with the raw materials, in particular the raw materials derived from castor oil, in the production of a polyester polyol (A) may be any common polyol for use in the production of polyurethane foam provided that the common polyol is the desired polyhydric alcohol.

In order to produce a polyester polyol (A) that allows the cross-linking of a polyurethane resin or polyurethane foam to proceed sufficiently to produce a polyurethane resin or polyurethane foam having high rebound resilience, a polyhydric alcohol (hereinafter also referred to as a polyol) preferably has an average number of hydroxy groups (an average number of functional groups) of more than three but not more than eight. In order to increase the degree of cross-linking of the polyurethane resin or polyurethane foam and ensure rebound resilience, the average number of hydroxy groups more preferably ranges from 3.5 to 8. An average number of functional groups above eight results in an increase in the viscosity of the polyol, unfavorably making the use of the polyol in a foaming machine difficult in the production of a polyurethane foam. An increase in the viscosity of the polyol also unfavorably results in poor mixing in the production of a polyurethane resin. Examples of the polyhydric alcohol having more than three but not more than eight hydroxy groups include polyhydric alcohols, polyoxyalkylene polyols, and polyester polyols, each having four to eight hydroxy groups per molecule. These polyhydric alcohols can be used alone or in combination.

A polyhydric alcohol having two or three hydroxy groups per molecule or a polyoxyalkylene polyol or polyester polyol using the polyhydric alcohol having two or three hydroxy groups per molecule as an initiator may be used at the same time, provided that the polyhydric alcohols have an average hydroxy group number of more than three.

Examples of the polyhydric alcohol having four to eight hydroxy groups per molecule include tetravalent alcohols, such as diglycerin, pentaerythritol, and α-methylglucoside; hexavalent alcohols, such as dipentaerythritol; saccharides, such as glucose, sorbitol, dextrose, fructose, and sucrose, and derivatives thereof; and phenols having seven to eight hydroxy groups. Alkylene oxide adducts of the polyhydric alcohols described above can also be used, in which ethylene oxide, propylene oxide, and the like are bonded to the polyhydric alcohols. These polyhydric alcohols can be used alone or in combination.

Polyoxyalkylene polyols are oligomers or polymers produced by the ring-opening polymerization of alkylene oxides. In general, polyoxyalkylene polyols are produced by the ring-opening polymerization of alkylene oxides using an active hydrogen compound as an initiator in the presence of a catalyst. Examples of alkylene oxide compounds for use in the production of polyoxyalkylene polyols include ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, and phenyl glycidyl ether. Among these alkylene oxide compounds, ethylene oxide, propylene oxide, 1,2-butylene oxide, and styrene oxide are preferred, and ethylene oxide and propylene oxide are more preferred. These can be used alone or in combination. Polyoxyalkylene polyols are also referred to as polyoxyalkylene polyether polyols. It is desirable that the polyoxyalkylene polyols preferably have a hydroxyl value in the range of 100 to 1800 mgKOH/g, more preferably 200 to 1200 mgKOH/g. The polyoxyalkylene polyols can be used alone or in combination.

In the present invention, a polyhydric alcohol having two to three hydroxy groups per molecule can be used in combination with a polyol having four to eight hydroxy groups per molecule provided that the polyhydric alcohols have an average number of functional groups of more than three. Examples of the polyhydric alcohol having 2 to 3 hydroxy groups per molecule include dihydric alcohols having 2 to 10 carbon atoms, such as ethylene glycol, propylene glycol, diethylene glycol, dipropylene glycol, 1,3-propanediol, 1,3-butanediol, 1,4-butanediol, 1,5-pentanediol, 1,6-hexanediol, and 1,4-cyclohexanediol; trivalent alcohols having 2 to 10 carbon atoms, such as trimethylolpropane and glycerin; and phenols having two or more hydroxy groups, such as bisphenol A. Alkylene oxide adducts of the polyhydric alcohols described above can also be used, in which ethylene oxide, propylene oxide, and the like are bonded to the polyhydric alcohols. These polyhydric alcohols can be used alone or in combination.

Polyester Polyol (A)

A polyester polyol (A) having a hydroxyl value in the range of 15 to 100 mgKOH/g according to the present invention can be produced by the condensation of a fatty acid having a hydroxy group and a fatty acid ester having a hydroxy group, particularly derived from castor oil, with the polyhydric alcohol having an average number of functional groups of more than three but not more than eight in the raw materials. In this case, the condensation of a fatty acid having a hydroxy group and/or a fatty acid ester having a hydroxy group may be followed by the condensation of the condensate with a polyhydric alcohol. Alternatively, the condensation of a polyhydric alcohol with a fatty acid having a hydroxy group and/or a fatty acid ester having a hydroxy group may be followed by the condensation of the fatty acid having a hydroxy group and/or the fatty acid ester having a hydroxy group.

An apparatus for synthesizing a polyester polyol may be provided with a distillation apparatus to remove water produced or alcohols. These condensation reactions may be performed in an inert gas, such as nitrogen gas, at a high temperature in the absence of solvent. Another known method, such as solution polymerization, may also be used. The temperature of condensation in the absence of solvent may be any temperature at which dehydration condensation can proceed. Considering that ricinoleic acid or 12-hydroxystearic acid decomposes at approximately 200° C. and undergoes intramolecular dehydration, the condensation temperature preferably ranges from 140° C. to 200° C., more preferably 160° C. to 180° C. While the reaction pressure may be normal pressure, high pressure, or low pressure, normal pressure or low pressure is preferred in terms of reaction efficiency. A tin catalyst, such as tin octanoate or dibutyltin dilaurate, or another catalyst, such as a titanium catalyst, may be used as an esterification catalyst.

A polyester polyol (A) according to the present invention has an acid value in the range of 0 to 5 mgKOH/g, preferably 0 to 3 mgKOH/g, more preferably 0 to 2 mgKOH/g. An acid value above 5 mgKOH/g unfavorably results in a delay in reactivity in a urethane reaction. In terms of reactivity control, the acid value is preferably 3 mgKOH/g or less, more preferably 2 mgKOH/g or less.

A polyester polyol (A) according to the present invention has a hydroxyl value in the range of 15 to 100 mgKOH/g, preferably 20 to 80 mgKOH/g, more preferably 25 to 60 mgKOH/g. A hydroxyl value of 15 mgKOH/g or more is preferred because curing in the production of foam proceeds in a short period of time. A hydroxyl value of 100 mgKOH/g or less is preferred because of rebound resilience and hardness suitable for flexible polyurethane foam having high rebound resilience.

A polyester polyol (A) according to the present invention has a viscosity of 20000 mPa·s or less, preferably 15000 mPa·s or less, more preferably 10000 mPa·s or less, at 25° C.

Use of a fatty acid having a hydroxy group derived from castor oil and/or a fatty acid ester having a hydroxy group derived from castor oil in the raw materials can markedly increase the amount of plant-derived component in a polyurethane foam produced using a polyester polyol (A) according to the present invention, thereby further contributing to the reduction of load on the environment. In accordance with the concept of carbon neutrality, a polyol and polyurethane foam produced from plant-derived crude glycerin can emit less carbon dioxide by combustion. Use of biomass feedstocks in polymers can be determined by calculating the proportion of carbon having a mass number of 14 (14C concentration) from the content of carbon having a mass number of 14 and the content of carbon having mass numbers of 12 and 13 in accordance with ASTM D6866.

More specifically, in accordance with a standard examination method in U.S.A. (ASTM) D6866 (Standard Test Method for Determining the Biobased Content of Natural Range Materials Using Radiocarbon and Isotope Ratio Mass Spectrometry Analysis), a sample is burned into $CO_2$, and a precise volume of $CO_2$ gas is introduced into an accelerated mass spectrometry (AMS) apparatus to measure the content of carbon having a mass number of 14 and the content of carbon having mass numbers of 12 and 13. Comparison with the abundance of carbon having a mass number of 14 in the atmosphere or petrochemical products allows for the determination.

Alternatively, a sample is burned into $CO_2$, and $CO_2$ is absorbed into a $CO_2$ absorbent or is converted into benzene. The amount of carbon having a mass number of 14 is measured with a liquid scintillation counter and is compared with a compound derived from petroleum for the determination.

Carbon having a mass number of 14 cannot be observed in polyols synthesized only using petroleum-derived raw materials. Use of plant-derived raw materials allows carbon having a mass number of 14 to be observed. In order to reduce carbon dioxide emissions, the 14C concentration of polyurethane foam may be 10 percent modern carbon (pMC) or more, preferably 20 pMC or more, more preferably 30 pMC.

A polyurethane foam produced from a polyester polyol (A) according to the present invention can have a good balance of high rebound resilience, moderate hardness, and high durability. In particular, the polyurethane foam can be suitably used as an environmentally-friendly cushioning material for vehicle seat cushions.

A polyester polyol (A) according to the present invention can also be used as a propylene oxide and/or ethylene oxide adduct of the polyol.

A polyester polyol (A) according to the present invention can also be used as a lactone adduct. Examples of lactone include β-lactones, such as β-propiolactone, γ-lactones, such as γ-butyrolactone, δ-lactones, such as δ-valerolactone, and ε-lactones, such as ε-caprolactone. β-propiolactone and ε-caprolactone are preferred.

A polyester polyol (A) according to the present invention can be used as a castor-oil-derived prepolymer having a terminal hydroxy group, which is produced by the reaction of the polyester polyol (A) with a polyisocyanate. Preferred examples of the polyisocyanate contained in the prepolymer include, but are not limited to, conventionally known tolylene diisocyanate (although the ratio of isomers, such as 2,4-isomer and 2,6-isomer, is not particularly limited, the ratio of 2,4-isomer/2,6-isomer is preferably 80/20), diphenylmethane diisocyanate, polymethylene polyphenyl polyisocyanate, and a mixture of tolylene diisocyanate and polymethylene polyphenyl polyisocyanate. A urethane-modified product or a carbodiimide-modified product of any of these polyisocyanates or a mixture of the urethane-modified polyisocyanate or the carbodiimide-modified polyisocyanate and tolylene diisocyanate can also preferably be used.

Other Polyols
(B) Low-Monool-Content Polyol

In the present invention, a low-monool-content polyol (B) may be used. The low-monool-content polyol (B) is a polyol generally used in the production of polyurethane foam and has a total degree of unsaturation of 0.035 meq/g or less, preferably 0.030 meq/g or less, more preferably 0.025 meq/g or less. The lower limit of the total degree of unsaturation may be, but is not limited to, 0.001 meq/g. A modified product of the low-monool-content polyol (B) may also be used. These low-monool-content polyols (B) can be used alone or in combination.

The polyol (P) contains 5% to 95% by mass, preferably 5% to 90% by mass, more preferably 10% to 80% by mass, most preferably 10% or more but less than 50% by mass, of the low-monool-content polyol (B) based on 100% by mass of all components of the polyol (P). Less than 5% by mass of the low-monool-content polyol (B) is unfavorable in terms of formability. More than 80% by mass of the low-monool-content polyol (B) cannot contribute to the reduction of load on the environment and is unfavorable.

Preferred examples of the low-monool-content polyol (B) include polyether polyols having a total degree of unsaturation in the range described above (hereinafter also referred to as a "polyether polyol (B1)") and modified products thereof. These low-monool-content polyols can be used alone or in combination.

Polyether Polyol (B1)

The polyether polyol (B1) may be an oligomer or polymer that is produced by the ring-opening polymerization of an alkylene oxide using an active hydrogen compound initiator generally in the presence of a catalyst and that has a total degree of unsaturation in the range described above.

In the production of polyether polyols, it is generally known that the ring-opening polymerization of an alkylene oxide using an initiator in the presence of a catalyst also produces a monool having a terminal unsaturated group as the molecular weight of the polyether polyol increases. The monool content is generally expressed by the total degree of unsaturation of the polyether polyol. A lower total degree of unsaturation indicates a lower monool content.

The monool in the polyether polyol has a lower molecular weight than the main component, the polyether polyol. The monool therefore greatly increases the molecular weight distribution of the polyether polyol and reduces the average number of functional groups. Use of such a polyether polyol having a high monool content in the production of polyurethane foam may result in deterioration in the physical properties of the polyurethane foam, such as high hysteresis loss, low hardness, low extensibility, low durability, and poor curing characteristics. The term "durability", as used herein, specifically refers to, for example, wet heat compression set, which is a measure of a decrease in the thickness of a cushion after long-term use. Use of such a polyether polyol having a high monool content in the production of polyurethane resin may also result in deterioration in extensibility and durability.

An increase in the monool content of the polyether polyol tends to increase lattice defects in polyurethane foam produced from the polyether polyol. This decreases cross-linking density, resulting in an increase in the degree of swelling of the polyurethane foam in a polar organic solvent, such as dimethylformamide. In general, the relationship between the degree of swelling and cross-linking density is expressed by a Flory-Rehner equation described in P. J. Flory, "Principle of Polymer Chemistry", Cornell University Press (1953). The relationship between monool content and the degree of swelling in a polar organic solvent is disclosed in Usaka et al., "A Raw Materials System Concept for Wider Ranging Demands of Flexible Polyurethane Molded Foam", Polyurethane Expo 2002 Conference Proceedings (2002), pp. 75-82. Likewise, an increase in the monool content of the polyether polyol may also result in a decrease in the cross-linking density of a polyurethane resin and an increase in the degree of swelling of the polyurethane resin in a polar solvent.

Thus, the monool content responsible for the deterioration in the physical properties of a polyurethane foam or polyurethane resin is preferably reduced.

Catalysts

A polyether polyol (B1) having a low total degree of unsaturation, that is, a low monool content can be produced at least using at least one compound selected from compounds having a nitrogen-phosphorus double bond, cesium hydroxide, and rubidium hydroxide as a catalyst. Use of such a compound as a catalyst can reduce the amount of monool as compared with the case where a conventionally known alkali metal hydroxide, such as potassium hydroxide, is used as a catalyst, thus improving the physical properties of the resulting polyurethane foam or polyurethane resin. For example, it is difficult to achieve a good balance of moderate hardness and rebound resilience and high durability using an alkali metal hydroxide as a catalyst. However, use of the above-mentioned compound as a catalyst can achieve a good balance of these properties. In particular, these beneficial effects of the low-monool-content polyol are remarkable in the case that the low-monool-content polyol is used in combination with a plant-derived polyol, which generally contains impurities and is often inferior in performance to petroleum-derived polyols.

Examples of the compounds having a nitrogen-phosphorus double bond include, but are not limited to, compounds described in Japanese Unexamined Patent Application Publication Nos. 11-106500, 2000-297131, and 2001-106780. Among these, phosphazenium compounds are preferred.

Active Hydrogen Compounds

Examples of the active hydrogen compound include active hydrogen compounds having an active hydrogen atom on an oxygen atom and active hydrogen compounds having an active hydrogen atom on a nitrogen atom. Active hydrogen compounds having a number of functional groups in the range of two to eight are preferred.

Examples of the active hydrogen compounds having an active hydrogen atom on an oxygen atom include water, carboxylic acids having 1 to 20 carbon atoms, polyvalent carboxylic acids having 2 to 6 carboxy groups per molecule and 2 to 20 carbon atoms, carbamic acids, alcohols having 1 to 20 carbon atoms, polyhydric alcohols having 2 to 8 hydroxy groups per molecule and 2 to 20 carbon atoms, saccharides and derivatives thereof, aromatic compounds having 1 to 3 hydroxy groups per molecule and 6 to 20 carbon atoms, and poly(alkylene oxide)s having 2 to 8 terminals per molecule and a hydroxy group on at least one of the terminals.

Examples of the active hydrogen compounds having an active hydrogen atom on a nitrogen atom include aliphatic or aromatic primary amines having 1 to 20 carbon atoms, aliphatic or aromatic secondary amines having 2 to 20 carbon atoms, polyvalent amines having 2 to 3 primary or secondary amino groups per molecule and 2 to 20 carbon atoms, saturated cyclic secondary amines having 4 to 20 carbon atoms, unsaturated cyclic secondary amines having 4 to 20 carbon atoms, cyclic polyvalent amines having 2 to 3 secondary amino groups per molecule and 4 to 20 carbon atoms, unsubstituted or N-monosubstituted acid amides having 2 to 20 carbon atoms, 5- to 7-membered cyclic amides, and dicarboximides having 4 to 10 carbon atoms.

These active hydrogen compounds can be used alone or in combination. Among these active hydrogen compounds, polyhydric alcohols having 2 to 20 carbon atoms and 2 to 8 hydroxy groups per molecule are preferred, and ethylene glycol, propylene glycol, diethylene glycol, dipropylene glycol, glycerin, diglycerin, and pentaerythritol are more preferred.

Alkylene Oxides

Among the alkylene oxides described above, alkylene oxides having 2 to 12 carbon atoms are preferred. Specific examples include ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, and phenyl glycidyl ether. Ethylene oxide, propylene oxide, 1,2-butylene oxide, and styrene oxide are more preferred. Ethylene oxide and propylene oxide are particularly preferred.

These alkylene oxides can be used alone or in combination. In the combined use of these alkylene oxides, a plurality of alkylene oxides may be simultaneously or sequentially subjected to addition polymerization, or sequential addition polymerization may be performed repeatedly.

The polyether polyol (B1) can be produced in accordance with reaction conditions and production methods described in Japanese Unexamined Patent Application Publication Nos. 2000-297131 and 2001-106780.

Among polyether polyols (B1) thus produced, polyether polyols produced by the addition polymerization of an alkylene oxide including ethylene oxide are preferred. The polyether polyol (B1) preferably has a hydroxyl value in the range of 10 to 40 mgKOH/g, more preferably 20 to 38 mgKOH/g. The content of a constitutional unit derived from ethylene oxide (the total oxyethylene group content) preferably ranges from 5% to 30% by mass, more preferably 10% to 20% by mass, based on 100% by mass of all the constitutional units derived from the alkylene oxides constituting the polyether polyol (B1).

(PB) Polymer-Dispersed Polyol

In the present invention, the (A) polyester polyol or the (B) low-monool-content polyol may be used directly or in the form of a polymer-dispersed polyol. In the polymer-dispersed polyol, polymer fine particles produced in these polyols by the radical polymerization of a compound having an unsaturated bond are dispersed in these polyols. These polyols may be used in combination with a polymer-dispersed polyol.

The polyol (P) contains 0% to 80% by mass, preferably 0% to 50% by mass, more preferably 0% to 30% by mass, of the polymer-dispersed polyol based on 100% by mass of all components of the polyol (P). More than 80% by mass of the polymer-dispersed polyol cannot contribute to the reduction of load on the environment and is unfavorable.

The polymer-dispersed polyol is preferably a polymer polyol derived from the low-monool-content polyol (B) (hereinafter also referred to as a "polymer polyol (PB)"), more preferably a polymer polyol derived from the polyether polyol (B1) (hereinafter also referred to as a "polymer polyol (PB1)"), particularly preferably a polymer polyol derived from a polyether polyol (B1) having a hydroxyl value in the range of 15 to 60 mgKOH/g.

The polymer-dispersed polyol can be a dispersion containing vinyl polymer particles dispersed in the (A) polyester polyol or the (B) low-monool-content polyol. The dispersion can be produced by the dispersion polymerization of a compound having an unsaturated bond in the (A) polyester polyol or the (B) low-monool-content polyol using a radical initiator, such as azobisisobutyronitrile. The vinyl polymer particles may be formed of a polymer of the compound having an unsaturated bond. In preferred polymer particles, at least part of the compound having an unsaturated bond is grafted to the dispersion medium polyol during dispersion polymerization.

The compound having an unsaturated bond has an unsaturated bond in the molecule and may be acrylonitrile, styrene, or acrylamide. These compounds having an unsaturated bond can be used alone or in combination.

In addition to the compound having an unsaturated bond, a dispersion stabilizer and/or a chain transfer agent may be added in the production of the polymer-dispersed polyol.

In the production of flexible polyurethane foam having high rebound resilience applicable to seat pads for vehicles, such as automobiles, the polyester polyol (A) is preferably used in combination with the low-monool-content polyol (B) and the polymer polyol (PB) and is more preferably used in combination with the polyether polyol (B1) and the polymer polyol (PB1).

Polyols Other than Low-Monool-Content Polyol (B) and Polymer-Dispersed Polyol

A composition for polyurethane foam according to the present invention may contain another polyol generally used in the production of polyurethane foam, as well as the polyester polyol (A), the low-monool-content polyol (B), and the polymer-dispersed polyol. Examples of such polyols include polyether polyols having a total degree of unsaturation above 0.035 meq/g, polymer polyols derived from these polyether polyols, and polyester polyols. The polyol (P) contains 5% to 95% by mass, preferably 10% to 80% by mass, more preferably 10% to 70% by mass, of such a polyol based on 100% by mass of all components of the polyol (P). Less than 5% by mass of such a polyol is unfavorable in terms of formability. More than 95% by mass of such a polyol cannot contribute to the reduction of load on the environment and is unfavorable.

Polyether Polyol (C)

A polyether polyol having a total degree of unsaturation above 0.035 meq/g (hereinafter also referred to as a "polyether polyol (C)") may be an oligomer or polymer produced by the ring-opening polymerization of an alkylene oxide and having a total degree of unsaturation above 0.035 meq/g. Such a polyether polyol (C) is generally produced by the ring-opening polymerization of an alkylene oxide using an active hydrogen compound initiator in the presence of a catalyst, for example, an alkali metal hydroxide, such as potassium hydroxide.

Active Hydrogen Compounds

The active hydrogen compound may be the active hydrogen compound exemplified for the polyether polyol (B1). These active hydrogen compounds can be used alone or in combination. Among these active hydrogen compounds, polyhydric alcohols having 2 to 20 carbon atoms and 2 to 8 hydroxy groups per molecule are preferred, and ethylene glycol, propylene glycol, diethylene glycol, dipropylene glycol, glycerin, diglycerin, and pentaerythritol are more preferred.

Alkylene Oxides

The alkylene oxide may be the alkylene oxide exemplified for the polyether polyol (B1) and is more preferably ethylene oxide, propylene oxide, 1,2-butylene oxide, or styrene oxide, particularly preferably ethylene oxide or propylene oxide.

These alkylene oxides can be used alone or in combination. In the combined use of these alkylene oxides, a plurality of alkylene oxides may be simultaneously or sequentially subjected to addition polymerization, or sequential addition polymerization may be performed repeatedly.

The polyether polyol (C) can be produced using catalysts, reaction conditions, and production methods described in Otsu Takayuki, "Kaitei Kobunshi Gosei no Kagaku", the first impression of the second edition, Kagaku-Dojin Publishing Company, Inc (1989) pp. 172-180, and Matsudaira Nobutaka and Maeda Tetsuro, "Poriuretan", the eighth impression, Maki Shyoten (1964) pp. 41-45.

Among polyether polyols (C) thus produced, polyether polyols produced by the addition polymerization of an alkylene oxide including ethylene oxide are preferred. The content of a constitutional unit derived from ethylene oxide (the total oxyethylene group content) preferably ranges from 5% to 30% by mass, more preferably 10% to 20% by mass, based on 100% by mass of all the constitutional units derived from the alkylene oxides constituting the polyether polyol (C).

Polymer Polyol (PC)

A polymer polyol used as another polyol may be a polymer polyol derived from the polyether polyol (C) (hereinafter also referred to as a "polymer polyol (PC)") and is preferably a polymer polyol derived from the polyether polyol (C) having a hydroxyl value in the range of 15 to 60 mgKOH/g.

The polymer polyol (PC) can be a dispersion containing vinyl polymer particles dispersed in the polyether polyol (C). The dispersion can be produced by the dispersion polymerization of a compound having an unsaturated bond in the polyether polyol (C) using a radical initiator, such as azobisisobutyronitrile. The vinyl polymer particles may be formed of a polymer of the compound having an unsaturated bond. In preferred polymer particles, at least part of the compound having an unsaturated bond is grafted to the dispersion medium polyether polyol (C) during dispersion polymerization.

The compound having an unsaturated bond may be the compound having an unsaturated bond exemplified for the specific polymer polyol described above. These compounds having an unsaturated bond can be used alone or in combination. In the production of the polymer polyol (PC), the compound having an unsaturated bond may be used in combination with a dispersion stabilizer and/or a chain transfer agent.

Polyester Polyol

Examples of the polyester polyol include condensates between low-molecular polyols and carboxylic acids, and lactone polyols, such as products of the ring-opening polymerization of ε-caprolactone and products of the ring-opening polymerization of β-methyl-δ-valerolactone.

Examples of the low-molecular polyols include dihydric alcohols having 2 to 10 carbon atoms, such as ethylene glycol and propylene glycol, trivalent alcohols having 2 to 10 carbon atoms, such as glycerin, trimethylolpropane, and trimethylolethane, tetravalent alcohols, such as pentaerythritol and diglycerin, and saccharides, such as sorbitol and sucrose.

Examples of the carboxylic acids include dicarboxylic acids having 2 to 10 carbon atoms, such as succinic acid, adipic acid, maleic acid, fumaric acid, phthalic acid, and isophthalic acid, and acid anhydrides having 2 to 10 carbon atoms, such as succinic anhydride, maleic anhydride, and phthalic anhydride.

Blowing Agents

A blowing agent according to the present invention may be a physical foaming agent, such as liquefied carbon dioxide, and is most preferably water.

When water is used as a blowing agent, the amount of water preferably ranges from 1.3 to 6.0 parts by mass, more preferably 1.8 to 5.0 parts by mass, particularly preferably 2.0 to 4.0 parts by mass, based on 100 parts by mass of all the components of the polyol (P). This amount of water serving as a blowing agent can effectively stabilize foams.

As the blowing agent, physical foaming agents, such as hydroxyfluorocarbons (such as HFC-245fa) developed for the purpose of global environmental protection, hydrocarbons (such as cyclopentane), carbon dioxide, and liquefied carbon dioxide can be used in combination with water. Among these, carbon dioxide and liquefied carbon dioxide are preferred in terms of the reduction of load on the environment.

Catalysts

Catalysts for use in the present invention are used for the reaction between the polyol (P) and a polyisocyanate and may be, but are not limited to, conventionally known catalysts. Preferred examples of the catalysts include aliphatic amines, such as triethylenediamine, bis(2-dimethylaminoethyl)ether, 1-isobutyl-2-methylimidazole, and morpholine, and organic tin compounds, such as stannous octoate and dibutyltin dilaurate.

These catalysts can be used alone or in combination. The amount of catalyst preferably ranges from 0.1 to 10 parts by mass per 100 parts by mass of all the components of the polyol (P).

Foam Stabilizers

Foam stabilizers for use in the present invention may be conventionally known foam stabilizers and are not particularly limited. In general, organic silicon surfactants are preferably used.

Preferred examples of foam stabilizers include FV-1013-16, SRX-274C, SF-2969, SF-2961, SF-2962, L-5309, L-3601, L-5307, L-3600, L-5366, SZ-1325, SZ-1328, and Y-10366, manufactured by Dow Corning Toray Silicone Co., Ltd. The amount of foam stabilizer preferably ranges from 0.1 to 10 parts by mass, more preferably 0.5 to 5 parts by mass, per 100 parts by mass of all the components of the polyol (P).

Polyisocyanates

Polyisocyanates for use in the present invention may be, but are not limited to, conventionally known polyisocyanates described in "Poriuretan Jushi Handobukku", edited by Iwata Keiji, the first impression, Nikkan Kogyo Shimbun Ltd., (1987) pp. 71-98. Among these, polyisocyanates preferably used to produce foam are toluylene diisocyanate (although the ratio of isomers, such as 2,4-isomer and 2,6-isomer, is not particularly limited, the ratio of 2,4-isomer/2,6-isomer is preferably 80/20), polymethylene polyphenyl polyisocyanate (for example, Cosmonate M-200 manufactured by Mitsui Chemicals Polyurethane Co., Ltd.), urethane-modified products thereof, and mixtures thereof.

In the case that the polyisocyanate is a mixture of toluylene diisocyanate and another polyisocyanate, it is desirable that the amount of toluylene diisocyanate preferably range from 50% to 99% by mass, more preferably 70% to 90% by mass, particularly preferably 75% to 85% by mass, of the total amount of the polyisocyanates in terms of a balance of the durability and the mechanical strength of foam.

Polyisocyanates used to produce polyurethane resins include toluylene diisocyanate (although the ratio of isomers, such as 2,4-isomer and 2,6-isomer, is not particularly limited, the ratio of 2,4-isomer/2,6-isomer is preferably 80/20), diphenylmethane diisocyanate (for example, Cosmonate PH manufactured by Mitsui Chemicals, Inc.), xylylene diisocyanate, norbornene diisocyanate, naphthalene diisocyanate, bis(isocyanatomethyl)cyclohexane, and hexamethylene diisocyanate.

In the present invention, it is desirable that each component be used such that the NCO index preferably ranges from 0.70 to 1.30, more preferably 0.80 to 1.20. The NCO index in this range can result in the production of a polyurethane foam or polyurethane resin that has moderate hardness and mechanical strength, as well as moderate rebound resilience, elongation percentage, and formability, suitable for a cushioning material. The term "NCO index", as used herein, refers to a value calculated by dividing the total number of isocyanate groups of the polyisocyanate by the total number of active hydrogen atoms reactive with the isocyanate groups, such as hydroxy groups of a polyol, amino groups of a cross-linker, or water. When the number of active hydrogen atoms reactive with the isocyanate groups is stoichiometrically equivalent to the number of isocyanate groups of the polyisocyanate, the NCO index is 1.0.

Other Aids

In addition to the components described above, a composition for polyurethane according to the present invention can contain a chain extending agent, a cross-linker, a communicating agent, an antifoaming agent, and other aids, such as additive agents generally used in the production of polyurethane foam or polyurethane resins, for example, a flame retardant, a pigment, an ultraviolet absorber, and an antioxidant, without compromising the objects of the present invention.

The additive agents include those described in Matsudaira Nobutaka and Maeda Tetsuro, "Poriuretan", the eighth impression, Maki Shyoten, (1964) pp. 134-137, and Matsuo Hitoshi, Kunii Nobuaki, and Tanabe Kiyoshi, "Kinousei Poriuretan", the first impression, CMC Publishing Co., Ltd., (1989) pp. 54-68.

Cross-Linkers

A cross-linker can be used in a polyurethane foam or polyurethane resin according to the present invention described below. Thus, a composition for polyurethane according to the present invention can contain a cross-linker. The cross-linker is preferably a compound having a hydroxyl value in the range of 200 to 1800 mgKOH/g.

Examples of the cross-linker include aliphatic polyhydric alcohols, such as glycerin, and alkanolamines, such as diethanolamine and triethanolamine.

Polyoxyalkylene polyols having a hydroxyl value in the range of 200 to 1800 mgKOH/g can also be used as cross-linkers. Conventionally known cross-linkers can also be used as cross-linkers. The amount of cross-linker preferably ranges from 0.5 to 10 parts by mass per 100 parts by mass of all the components of the polyol (P).

Polyurethane Resin and Method for Producing Polyurethane Resin

A method for producing a polyurethane resin according to the present invention is not particularly limited. A conventionally known production method can be appropriately employed. More specifically, a polyol (P) containing a polyester polyol (A) can be mixed with a catalyst, an antifoaming agent, another polyol, such as a low-monool-content polyol (B), other aids, and a cross-linker to produce a resin premix. The resin premix is then mixed with a polyisocyanate. The mixture cures to yield a polyurethane resin. Alternatively, a polyol (P) containing a polyester polyol (A) is reacted with an excessive amount of isocyanate to synthesize a prepolymer having terminal isocyanate groups. The prepolymer is then mixed with a catalyst and a necessary cross-linker to produce a polyurethane resin.

A polyurethane resin according to the present invention has a good balance of high rebound resilience, moderate hardness, and high durability. In particular, use of raw materials derived from castor oil can contribute to the reduction of load on the environment. The polyurethane resin can preferably be used in applications requiring high rebound resilience, such as adhesives and sealants.

The polyurethane resin has a Shore A hardness generally in the range of 30 to 90, preferably 35 to 90, more preferably 40 to 70, under conditions in conformity with JIS K6253, a rebound resilience (%) of generally 50% or more, preferably in the range of 60% to 80%, more preferably 65% to 80%, under conditions in conformity with JIS K6255, a maximum stress (MPa) of generally 0.5 MPa or more, preferably 0.8 MPa or more, under conditions in conformity with JIS K6251, and a maximum elongation percentage (%) in the range of 50% to 400%, preferably 60% to 200%, under conditions in conformity with JIS K6251.

Polyurethane Foam and Method for Producing Polyurethane Foam

A method for producing a polyurethane foam according to the present invention is not particularly limited. A conventionally known production method can be appropriately employed. More specifically, slab forming, hot cure molding, or cold cure molding can be employed. Cold cure molding is preferred in the production of seat pads for vehicles, such as automobiles.

A method for producing a polyurethane foam by cold cure molding may be a known cold cure molding method. For example, a polyol (P) containing a polyester polyol (A) can be mixed with a blowing agent, a catalyst, a foam stabilizer, another polyol, such as a low-monool-content polyol (B), other aids, and a cross-linker to produce a resin premix. The resin premix is then mixed with a polyisocyanate in a high-pressure foaming machine or a low-pressure foaming machine at a predetermined NCO index. The mixture is then injected into a metal mold and is allowed to foam and cure to yield a polyurethane foam having a predetermined shape.

The curing time generally ranges from 30 seconds to 30 minutes. The mold temperature generally ranges from room temperature to approximately 80° C. The curing temperature preferably ranges from room temperature to approximately 150° C. The hardened material may be heated at a temperature in the range of 80° C. to 180° C. without compromising the objects and advantageous effects of the present invention.

The resin premix is generally mixed with a polyisocyanate in a high-pressure foaming machine or a low-pressure foaming machine. When a hydrolyzable compound, such as an organotin catalyst, is used as a catalyst, in order to prevent the organotin catalyst from coming into contact with a blowing agent water, the water component and the organotin catalyst component are preferably injected into the foaming machine through different paths and are mixed in a mixing head of the foaming machine. The resin premix used preferably has a viscosity of 2500 mPa·s or less in view of mixing and formability of foam in the foaming machine.

Thus, use of raw materials derived from castor oil can provide a castor-oil-derived polyurethane foam that contributes to the reduction of load on the environment and that has a good balance of high rebound resilience, moderate hardness, and high durability. The rebound resilience range, moderate hardness range, and high durability range of polyurethane foams generally depend on the applications. A polyurethane foam according to the present invention is preferably used for seat cushions and seat backs of vehicles, such as automobiles, which require high rebound resilience.

In the case of seat cushions of vehicles, such as automobiles, which generally have a core density in the range of 40 to 75 kg/m$^3$, the moderate hardness range is preferably in the range of 140 to 280 N/314 cm$^2$, more preferably 200 to 260 N/314 cm$^2$, at 25% ILD. The moderate rebound resilience range is preferably in the range of 45% to 75%, more preferably 55% to 70%, most preferably 60% to 70%. The high durability range is preferably a wet heat compression set of 14% or less, more preferably 12% or less.

The phrase "achieve a good balance of moderate hardness range, rebound resilience range, and high durability range" means that hardness, high rebound resilience, and durability are simultaneously achieved in preferred ranges.

A polyurethane foam according to the present invention has an elongation percentage in the range of 50% to 200%, preferably 60% to 150%.

A polyurethane foam according to the present invention can be suitably used as a cushioning material, in particular seat pads for seat cushions and seat backs of vehicles, such as automobiles.

EXAMPLES

Although the present invention will be further described in detail in the following Examples, the present invention is not limited to these Examples. "Part" and "%" in the Examples represent "part by mass" and "% by mass", respectively. The analyses and measurements in the Examples and Comparative Examples were performed by the following methods.

(1) Core Density (Core Density is Abbreviated as "Dco" in Tables in the Examples)

The core density was measured in accordance with a method for measuring apparent density described in JIS K-6400. In the present invention, a skin was removed from a polyurethane foam sample to prepare a rectangular parallelepiped foam sample. The core density of the rectangular parallelepiped foam sample was measured.

(2) Hardness of Foam (Abbreviated as "25% ILD" in Tables in the Examples)

The foam hardness was measured in a polyurethane foam having a thickness of 100 mm in accordance with the A method described in JIS K-6400.

(3) Rebound Resilience (Abbreviated as "BR" in Tables in the Examples)

The rebound resilience was measured in accordance with a method described in JIS K-6400.

(4) Wet Heat Compression Set (Abbreviated as "WS" in Tables in the Examples)

The wet heat compression set was measured in accordance with a method described in JIS K-6400. In the measurements, a core of polyurethane foam formed was cut into 50 mm×50 mm×25 mm, which was used as a test specimen. The test specimen was pressed to the 50% thickness, was placed between parallel plates, and was left to stand at 50° C. and a relative humidity of 95% for 22 hours. Thirty minutes after the test specimen was removed, the thickness of the test specimen was measured and compared with the thickness before the test to determine the strain.

(5) Elongation Percentage

The elongation percentage was measured in accordance with a method described in JIS K-6400.

(6) Evaluation of Balance of Characteristics

In the foam hardness, rebound resilience, and wet heat compression set measured as described above, when the physical properties of foam satisfy the foam hardness in the range of 140 to 280 N/314 cm$^2$, the rebound resilience in the range of 60% to 75%, and the wet heat compression set of 14% or less, the characteristic balance of the foam was considered as good. When any of these physical properties was outside these ranges, the characteristic balance of the foam was considered as poor.

(7) Acid Value

The acid value was measured in accordance with a method described in JIS K-1557-5.

(8) Hydroxyl Value (OHV)

The hydroxyl value was measured in accordance with a method described in JIS K-1557-1.

(9) Total Degree of Unsaturation

The total degree of unsaturation was measured in accordance with a method described in JIS K-1557-3.

(10) Viscosity (mPa·s/25° C.)

A cone-and-plate viscometer (E-type viscometer) was used to measure the viscosity at 25° C.

(11) Measurement of the Purity of a Fatty Acid having a Hydroxy Group

The proportion of a fatty acid having a hydroxy group in the raw materials that contain at least one selected from the group consisting of fatty acids having a hydroxy group and fatty acid esters having a hydroxy group was determined by the ratio A/B, wherein A denotes the hydroxyl value of the fatty acid having a hydroxy group as determined by a method according to JIS K1557-1, and B denotes the acid value of the fatty acid having a hydroxy group as determined by a method according to JIS K1557-5.

(12) Measurement of the Purity of a Fatty Acid Ester Having a Hydroxy Group by $^1$H-NMR Raw materials that contain at least one selected from the group consisting of fatty acids having a hydroxy group and fatty acid esters having a hydroxy group were dissolved in deuteriochloroform and were subjected to $^1$H-NMR measurement with a nuclear magnetic resonance spectrometer AL-400 manufactured by JEOL Datum Co. After the chemical shift peaks were identified, the proportion (%) of a fatty acid having a hydroxy group and a fatty acid ester having a hydroxy group in total was determined by 3C/D×100, wherein C denotes the peak area of protons bonded to a carbon atom adjacent to a hydroxy group, and D denotes the peak area D of protons of a terminal methyl group of an alkyl. The proportion of a fatty acid having a hydroxy group determined by the method described above was subtracted from the proportion (%) of a fatty acid having a hydroxy group and a fatty acid ester having a hydroxy group in total to calculate the proportion of a fatty acid ester having a hydroxy group. The proportion of a mixture of (i) one type of fatty acid having a hydroxy group and an ester derived from (i) the one type of fatty acid having a hydroxy group in the raw materials was also determined in the same manner as the $^1$H-NMR measurements described above. The proportion of an ester derived from (i) the one type of fatty acid having a hydroxy group was calculated by subtracting the proportion of a fatty acid having a hydroxy group determined by the method described above from the proportion of the mixture. The total amount (purity: %) of fatty acid having a hydroxy group and fatty acid ester having a hydroxy group in the raw materials was calculated from the measurements of (11) and (12).

(13) Proportion of Carbon-Carbon Double Bond in the Molecule

The proportion of a fatty acid having a hydroxy group and a carbon-carbon double bond and/or a fatty acid ester having a hydroxy group and a carbon-carbon double bond in the raw materials that contain at least one selected from the group consisting of fatty acids having a hydroxy group and fatty acid esters having a hydroxy group was determined by $^1$H-NMR in the same manner as the purity measurement in (12). The proportion (%) was calculated by 3E/2D×100, wherein E denotes the peak area of protons bonded to the carbon-carbon double bonds, and D denotes the peak area of protons of a terminal methyl group of an alkyl, as determined by $^1$H-NMR.

(14) Shore A Hardness

The Shore A hardness of a sample for hardness measurement prepared by the method described in the resin preparation method was measured in accordance with a method described in JIS K6253 with a hardness meter manufactured by Kobunshi Keiki Co., Ltd.

(15) Rebound Resilience (%)

The rebound resilience of a sample for the measurement of rebound resilience prepared by the method described in the resin preparation method was measured in accordance with a Lubke process (Lubke method) described in JIS K6255 with a rebound resilience tester manufactured by Ueshima Seisakusho Co., Ltd.

(16) Tensile Strength (Maximum Stress: MPa, Maximum Elongation Percentage: %)

A specimen was punched out with a JIS No. 3 dumbbell from a sample for the measurement of tensile strength prepared by the method described in the resin preparation method. The tensile strength (the maximum stress and the maximum elongation percentage) of the specimen was measured by a method described in JIS K6251.

Purification of Castor Oil Fatty Acid

Purification Example 1

Castor oil fatty acid, which is a raw material derived from castor oil, was used as a raw material that contained at least one selected from the group consisting of fatty acids having a hydroxy group and fatty acid esters having a hydroxy group.

Components having no hydroxy group, which were low-boiling components, were removed with a molecular distillation apparatus having an evaporation area of 0.03 m$^2$ (manufactured by Sibata Scientific Technology Ltd.) from castor oil fatty acid (trade name CO-FA manufactured by Itoh Oil Chemicals Co., Ltd., purity: 86%) produced by the hydrolysis of castor oil. Thus, a high-purity castor oil fatty acid was produced. The evaporation conditions were as follows: feed rate=200 g/h, evaporation surface temperature=160° C., pressure=15 Pa, and the number of revolutions of a wiper=300 rpm. The resulting high-purity castor oil fatty acid had an acid value of 180.7 mgKOH/g and a hydroxyl value of 172.9 mgKOH/g. On the basis of these values, the purity of the high-purity castor oil fatty acid (1) was determined to be 95.7%. The high-purity castor oil fatty acid (1) was identified as ricinoleic acid.

Purification Example 2

The same procedures as in Purification Example 1 were performed except that the feed rate was 220 g/h and the evaporation surface temperature was 170° C. The resulting high-purity castor oil fatty acid had an acid value of 176.3 mgKOH/g and a hydroxyl value of 173.5 mgKOH/g. On the basis of these values, the purity of the high-purity castor oil fatty acid (2) was determined to be 98.4%. The high-purity castor oil fatty acid (2) was identified as ricinoleic acid.

Purification Example 3

The same procedures as in Purification Example 1 were performed except that the feed rate was 75 g/h, the evaporation surface temperature was 150° C., and the pressure was 20 Pa. The resulting high-purity castor oil fatty acid had an acid value of 185.3 mgKOH/g and a hydroxyl value of 169.6 mgKOH/g. On the basis of these values, the purity of the high-purity castor oil fatty acid (3) was determined to be 91.5%. The high-purity castor oil fatty acid (3) was identified as ricinoleic acid.

Purification Example 4

Components having no hydroxy group, which were low-boiling components, were removed with a molecular distillation apparatus having an evaporation area of 0.03 m$^2$ (manufactured by Sibata Scientific Technology Ltd.) from a castor oil fatty acid ester (trade name CO-FA methyl ester D manufactured by Itoh Oil Chemicals Co., Ltd.) produced by the hydrolysis of castor oil and subsequent transesterification. Thus, a high-purity castor oil fatty acid methyl ester was produced. The evaporation conditions were as follows: feed rate=220 g/h, evaporation surface temperature=120° C., pressure=7 Pa, and the number of revolutions of a wiper=300 rpm. The resulting high-purity castor oil fatty acid methyl ester was further purified three times under the same conditions to produce a high-purity castor oil fatty acid methyl ester (4). This high-purity castor oil fatty acid methyl ester (4) had a purity of 98.6% as determined by $^1$H-NMR. The high-purity castor oil fatty acid methyl ester (4) was identified as methyl ricinoleate.

Purification Example 5

Four hundred grams of 12-hydroxystearic acid (12-HSA) manufactured by Itoh Oil Chemicals Co., Ltd. was added to 600 g of butanol and was heated to 50° C. to completely dissolve 12-HSA. Leaving the solution to stand in a room at 25° C. for four hours crystallized 12-HSA.

After vacuum filtration, the solid content was dried in a vacuum dryer at 25° C. for 24 hours to produce high-purity 12-HSA. This high-purity 12-HSA had a purity of 92.0% as determined by $^1$H-NMR.

Synthesis of Polyester Polyols

Synthesis Example 1: Polyester Polyol A-1

The high-purity castor oil fatty acid (1) produced in Purification Example 1 was mixed with castor oil fatty acid (trade name CO-FA manufactured by Itoh Oil Chemicals Co., Ltd., purity: 86%) such that the purity was 95.0%. 1944 g of this mixture, 78 g of SOR-400 (manufactured by Mitsui Chemicals Polyurethane Co., Ltd., a propylene oxide adduct of sorbitol, hydroxyl value=400 mgKOH/g), and 97 g of PE-450 (manufactured by Mitsui Chemicals Polyurethane Co., Ltd., a propylene oxide adduct of pentaerythritol, hydroxyl value=450 mgKOH/g) (the average number of functional groups of the polyhydric alcohols=4.6) were charged in a 2-L glass flask equipped with a thermometer, an agitator, and an apparatus for removing water produced. The condensation reaction was performed at 180° C. in a nitrogen stream. At an acid value of 10 mgKOH/g or less, 0.2 g of tetrabutyl orthotitanate (a reagent manufactured by Tokyo Chemical Industry Co., Ltd.) was added as a catalyst. The condensation reaction was continued at 180° C. for 109 hours. Table 1 shows the hydroxyl value (OHV), the average number of functional groups (calculated value), and the viscosity of the resulting polyester polyol A-1 (polyol A-1).

Synthesis Examples 2 to 8: Polyester Polyols A-2 to A-8

Polyols A-2 to A-8 were produced in the same manner as Synthesis Example 1 except that the amounts of high-purity castor oil fatty acids (1) and (3), high-purity castor oil fatty acid methyl ester (4), SOR-400, PE-450, and glycerin (Gly, manufactured by Wako Pure Chemical Industries, Ltd., guaranteed reagent) and the condensation reaction conditions were changed as shown in Table 1. As described in Synthesis Example 1, the high-purity castor oil fatty acid or the high-purity castor oil fatty acid methyl ester was mixed in advance with castor oil fatty acid (trade name CO-FA manufactured by Itoh Oil Chemicals Co., Ltd., purity: 86%) so as to have a predetermined purity shown in Table 1. In Synthesis Examples A-5 to A-7, castor oil fatty acid (CO-FA) was used in the synthesis.

Table 1 shows the hydroxyl value (OHV), the average number of functional groups (calculated value), and the viscosity of the resulting polyester polyols A-2 to A-8 (polyols A-2 to A-8).

Synthesis Examples 9 to 20: Polyester Polyols A-9 to A-20

Polyols A-9 to A-20 were produced in the same manner as Synthesis Example 1 except that the amounts of high-purity castor oil fatty acids (1) to (3), high-purity 12-HSA, SOR-400, and PE-450 and the condensation reaction conditions were changed as shown in Table 2 or 3. As described in Synthesis Example 1, the high-purity castor oil fatty acid was mixed in advance with castor oil fatty acid (CO-FA, purity: 86%) so as to have a predetermined purity shown in Table 2 or 3. In Synthesis Example 13, the total amount (purity) of castor oil fatty acid and 12-hydroxystearic acid in the raw materials was 93%. In Synthesis Example A-20, 12-hydroxystearic acid (manufactured by Itoh Oil Chemicals Co., Ltd., purity: 86%) was used in the synthesis.

Tables 2 and 3 show the hydroxyl value (OHV), the average number of functional groups (calculated value), and the viscosity of the resulting polyester polyols A-9 to A-20 (polyols A-9 to A-20).

TABLE 1

|  | Synthesis example 1 Polyol A-1 | Synthesis example 2 Polyol A-2 | Synthesis example 3 Polyol A-3 | Synthesis example 4 Polyol A-4 | Synthesis example 5 Polyol A-5 |
|---|---|---|---|---|---|
| Fatty acid having hydroxy group and fatty acid ester having hydroxy group | High-purity castor oil fatty acid (1) + castor oil fatty acid | High-purity castor oil fatty acid (1) + castor oil fatty acid | High-purity castor oil fatty acid (3) + castor oil fatty acid | High-purity castor oil fatty acid methyl ester (4) + castor oil fatty acid | Castor oil fatty acid |
| Purity of castor oil fatty acid (ester) (%) | 95 | 95 | 95 | 99 | 86 |
| Purity of 12-hydroxystearic acid (%) | — | — | — | — | — |
| Proportion of fatty acid (ester) having hydroxy group and carbon-carbon double bond (%) | 98 | 98 | 98 | 99 | 99 |
| Polyhydric alcohol | PE450/ SOR400 | PE450/ SOR400 | PE450/ SOR400 | PE450/ SOR400 | SOR400 |
| Average number of functional groups of polyhydric alcohol | 4.6 | 5.2 | 5.8 | 4.9 | 6 |
| OHV (mgKOH/g) | 30.9 | 55.2 | 33.3 | 27.5 | 34 |
| Average number of functional groups (calculated) | 3.5 | 4.4 | 4.4 | 4.4 | 3.5 |
| Viscosity (mPa · s/25° C.) | 5640 | 6570 | 14,000 | 16,300 | 3780 |
| Mass ratio of castor oil fatty acid (per mole of polyhydric alcohol) | 11.1 | 6.5 | 10.5 | 15.2 | 7.7 |

TABLE 1-continued

| Amount charged (g) | | | | | |
|---|---|---|---|---|---|
| PE-450 | 97 | 80 | 12 | 49.87 | |
| SOR-400 | 78 | 202 | 173 | 63.12 | 547 |
| MN-400 | | | | | |
| Glycerin | | | | | |
| Castor oil fatty acid, High-purity castor oil fatty acid, High-purity castor oil fatty acid ester | 1944 | 1821 | 1933 | 1716 | 4218 |
| High-purity 12-hydroxystearic acid | | | | | |
| Tetrabutyl orthotitanate | 0.2 | 0.2 | 0.2 | 7.3 | 0.5 |
| Condensation reaction conditions | 180° C. × 109 h | 180° C. × 84 h | 180° C. × 102 h | 180° C. × 296 h | 180° C. × 94 h |

| | Synthesis example 6 Polyol A-6 | Synthesis example 7 Polyol A-7 | Synthesis example 8 Polyol A-8 |
|---|---|---|---|
| Fatty acid having hydroxy group and fatty acid ester having hydroxy group | Castor oil fatty acid | Castor oil fatty acid | High-purity castor oil fatty acid (1) + castor oil fatty acid |
| Purity of castor oil fatty acid (ester) (%) | 86 | 86 | 95 |
| Purity of 12-hydroxystearic acid (%) | — | — | — |
| Proportion of fatty acid (ester) having hydroxy group and carbon-carbon double bond (%) | 99 | 99 | 98 |
| Polyhydric alcohol | SOR400 | Gly/PE450 | Gly |
| Average number of functional groups of polyhydric alcohol | 6 | 3.6 | 3 |
| OHV (mgKOH/g) | 53.9 | 59.2 | 57.8 |
| Average number of functional groups (calculated) | 4.4 | 2.6 | 2.6 |
| Viscosity (mPa · s/25° C.) | 2620 | 1630 | 2250 |
| Mass ratio of castor oil fatty acid (per mole of polyhydric alcohol) | 5.1 | 6.9 | 26.8 |
| Amount charged (g) | | | |
| PE-450 | | 234 | |
| SOR-400 | 368 | | |
| MN-400 | | | |
| Glycerin | | 32 | 76 |
| Castor oil fatty acid, High-purity castor oil fatty acid, High-purity castor oil fatty acid ester | 1867 | 1845 | 2048 |
| High-purity 12-hydroxystearic acid | | | |
| Tetrabutyl orthotitanate | 0.2 | 0.2 | 0.2 |
| Condensation reaction conditions | 180° C. × 84 h | 180° C. × 66 h | 180° C. × 57 h |

TABLE 2

| | Synthesis example 9 Polyol A-9 | Synthesis example 10 Polyol A-10 | Synthesis example 11 Polyol A-11 | Synthesis example 12 Polyol A-12 | Synthesis example 13 Polyol A-13 | Synthesis example 14 Polyol A-14 |
|---|---|---|---|---|---|---|
| Fatty acid having hydroxy group and fatty acid ester having hydroxy group | High-purity castor oil fatty acid (2) + castor oil fatty acid | High-purity castor oil fatty acid (2) + castor oil fatty acid | High-purity castor oil fatty acid (3) + castor oil fatty acid | High-purity castor oil fatty acid (3) + castor oil fatty acid | High-purity castor oil fatty acid (1) + castor oil fatty acid + high-purity 12-HSA | High-purity castor oil fatty acid (1) + castor oil fatty acid |
| Purity of castor oil fatty acid (%) | 90 | 90 | 95 | 97 | 95 | 95 |
| Purity of 12-hydroxystearic acid (%) | — | — | — | — | 91 | — |
| Proportion of fatty acid having hydroxy group and carbon-carbon double bond (%) | 98 | 98 | 98 | 98 | 49 | 98 |
| Polyhydric alcohol | PE450/SOR400 | PE450/SOR400 | PE450/SOR400 | PE450/SOR400 | PE450/SOR400 | PE450/SOR400 |
| Average number of functional groups of polyhydric alcohol | 5.6 | 5.9 | 4 | 4.9 | 5.4 | 4.7 |
| OHV (mgKOH/g) | 34.5 | 53.1 | 54.4 | 50.6 | 54.3 | 122 |

TABLE 2-continued

| | | | | | | |
|---|---|---|---|---|---|---|
| Average number of functional groups (calculated) | 3.5 | 4.4 | 3.5 | 4.4 | 4.4 | 4.5 |
| Viscosity (mPa · s/25° C.) | 4280 | 3410 | 3130 | 3730 | 4750 | 2120 |
| Mass ratio of castor oil fatty acid (per mole of polyhydric alcohol) | 8.0 | 5.3 | 7.2 | 7.0 | 3.0 | 2.5 |
| Amount charged (g) | | | | | | |
| PE-450 | 76 | 25 | 620 | 274 | 30 | 781 |
| SOR-400 | 514 | 800 | 26 | 379 | 117 | 710 |
| MN-400 | | | | | | |
| Glycerin | | | | | | |
| Castor oil fatty acid, high-purity castor oil fatty acid, or high-purity castor oil fatty acid ester | 4698 | 4387 | 4635 | 4570 | 447 | 3765 |
| High-purity 12-hydroxystearic acid | | | | | 450 | |
| Tetrabutyl orthotitanate | 0.8 | 2.0 | 0.5 | 2.0 | 0.4 | 1.0 |
| Condensation reaction conditions | 180° C. × 91 h | 180° C. × 59 h | 180° C. × 72 h | 180° C. × 59 h | 180° C. × 37 h | 180° C. × 41 h |

| | | Synthesis example 15 Polyol A-15 | Synthesis example 16 Polyol A-16 | Synthesis example 17 Polyol A-17 | Synthesis example 18 Polyol A-18 |
|---|---|---|---|---|---|
| | Fatty acid having hydroxy group and fatty acid ester having hydroxy group | High-purity 12-HSA | High-purity castor oil fatty acid (1) + castor oil fatty acid | High-purity castor oil fatty acid (1) + castor oil fatty acid | High-purity 12-HSA |
| | Purity of castor oil fatty acid (%) | — | 95 | 92 | — |
| | Purity of 12-hydroxystearic acid (%) | 92 | — | — | 92 |
| | Proportion of fatty acid having hydroxy group and carbon-carbon double bond (%) | 0 | 98 | 98 | 0 |
| | Polyhydric alcohol | PE450/SOR400 | PE450/SOR400 | PE450/SOR400 | PE450/SOR400 |
| | Average number of functional groups of polyhydric alcohol | 5.6 | 5.2 | 5.6 | 5.6 |
| | OHV (mgKOH/g) | 30.4 | 49.7 | 52.9 | 52.9 |
| | Average number of functional groups (calculated) | 3.5 | 4.4 | 4.4 | 4.4 |
| | Viscosity (mPa · s/25° C.) | 8400 | 4550 | 3600 | 5000 |
| | Mass ratio of castor oil fatty acid (per mole of polyhydric alcohol) | 9.4 | 7.2 | 6.0 | 5.7 |
| | Amount charged (g) | | | | |
| | PE-450 | 199.5 | 231 | 140.5 | 145.7 |
| | SOR-400 | 505 | 551 | 1037 | 984.1 |
| | MN-400 | | | | |
| | Glycerin | | | | |
| | Castor oil fatty acid, high-purity castor oil fatty acid, or high-purity castor oil fatty acid ester | | 5662 | 6736 | |
| | High-purity 12-hydroxystearic acid | 6595 | | | 6825 |
| | Tetrabutyl orthotitanate | 2.3 | 2.6 | 3.2 | 3.2 |
| | Condensation reaction conditions | 180° C. × 52 h | 180° C. × 34 h | 180° C. × 45 h | 180° C. × 54 h |

TABLE 3

| | Synthesis example 19 Polyol A-19 | Synthesis example 20 Polyol A-20 |
|---|---|---|
| Fatty acid having hydroxy group and fatty acid ester having hydroxy group | High-purity castor oil fatty acid (2) + castor oil fatty acid | 12-HSA |
| Purity of castor oil fatty acid (%) | 90 | — |
| Purity of 12-hydroxystearic acid (%) | — | 86 |
| Proportion of fatty acid having hydroxy group and carbon-carbon double bond (%) | 98 | 0 |
| Polyhydric alcohol | PE450/SOR400 | SOR400 |
| Average number of functional groups of polyhydric alcohol | 5.9 | 6 |
| OHV (mgKOH/g) | 52.0 | 53.3 |
| Average number of functional groups (calculated) | 4.4 | 4.2 |
| Viscosity (mPa·s/25° C.) | 3100 | 4110 |
| Mass ratio of castor oil fatty acid (per mole of polyhydric alcohol) | 5.2 | 4.9 |

TABLE 3-continued

|  | Synthesis example 19<br>Polyol A-19 | Synthesis example 20<br>Polyol A-20 |
|---|---|---|
| Amount charged (g) | | |
| PE-450 | 30 | |
| SOR-400 | 505 | 379 |
| Castor oil fatty acid, High-purity castor oil fatty acid, or High-purity castor oil fatty acid ester | 2791 | |
| High-purity 12-hydroxystearic acid | | 1841 |
| Tetrabutyl orthotitanate | 0.3 | 0.2 |
| Condensation reaction conditions | 180° C. × 117 h | 180° C. × 66 h |

Synthesis of Low-Monool-Content Polyols

Synthesis Example 21: Polyether Polyol (B1-1)

0.01 mole of tetrakis[tris(dimethylamino)phosphoranylideneamino]phosphonium hydroxide was added to one mole of glycerin. After vacuum dehydration at 100° C. for six hours, the addition polymerization of propylene oxide was performed at a reaction temperature of 80° C. and a maximum reaction pressure of 3.8 kg/cm². The addition polymerization of ethylene oxide was then performed at a reaction temperature of 100° C. and a maximum reaction pressure of 3.8 kg/cm² to produce a polyether polyol (B1-1). The polyol (B1-1) had a total degree of unsaturation of 0.025 meq/g, a hydroxyl value of 24 mgKOH/g, and a terminal oxyethylene group content of 15% by mass.

Synthesis Example 22: Polyether Polyol (C1-1)

0.37 mole of potassium hydroxide was added to one mole of glycerin. After vacuum dehydration at 100° C. for six hours, the addition polymerization of propylene oxide was performed at a reaction temperature of 115° C. and a maximum reaction pressure of 5.0 kg/cm². The addition polymerization of ethylene oxide was then performed at a reaction temperature of 115° C. and a maximum reaction pressure of 3.8 kg/cm² to produce a polyether polyol (C1-1). The polyol (C1-1) had a total degree of unsaturation of 0.062 meq/g, a hydroxyl value of 28 mgKOH/g, and a terminal oxyethylene group content of 15% by mass.

Synthesis Example 23: Polyether Polyol (C1-2)

0.37 mole of potassium hydroxide was added to one mole of glycerin. After vacuum dehydration at 100° C. for six hours, the addition polymerization of propylene oxide was performed at a reaction temperature of 115° C. and a maximum reaction pressure of 5.0 kg/cm². The addition polymerization of ethylene oxide was then performed at a reaction temperature of 115° C. and a maximum reaction pressure of 3.8 kg/cm² to produce a polyether polyol (C1-2). The polyol (C1-2) had a total degree of unsaturation of 0.051 meq/g, a hydroxyl value of 34 mgKOH/g, and a terminal oxyethylene group content of 15% by mass.

Synthesis of Polymer Polyols

Synthesis Example 24: Polymer Polyol (PB1-1)

A 1-liter autoclave equipped with a thermometer, an agitator, a pressure gauge, and a feeder was fully charged with the polyether polyol (B1-1) having a hydroxyl value of 24 mgKOH/g produced in Synthesis Example 21 and was heated to 120° C. while stirring. A liquid mixture of the polyether polyol (B1-1), a radical polymerization initiator, acrylonitrile, and a dispersion stabilizer was continuously added to the autoclave. The graft polymerization of acrylonitrile was performed at a reaction temperature of 120° C., a reaction pressure of 400 kPa, and a residence time of 50 minutes. After the initial fraction was removed from an outlet, a reaction solution was continuously obtained. The amounts of the raw materials were as follows:

Polyether polyol (B1-1): 7200 g (the total amount of polyether polyol (B1-1) contained in the autoclave and the liquid mixture)

Radical polymerization initiator: 50 g

Acrylonitrile: 1800 g

The radical polymerization initiator was as follows:

Radical polymerization initiator: 2,2'-azobis(2-isobutyronitrile)

The resulting reaction solution was heated at 120° C. under a reduced pressure of 655 Pa or less for three hours to remove unreacted acrylonitrile and decomposition products of the radical polymerization initiator, thus yielding a polymer polyol (PB1-1) having a hydroxyl value of 19 mgKOH/g. The polymer polyol (PB1-1) had a vinyl polymer content of 20% by mass (the total amount of acrylonitrile used was 20% by mass based on 100% by mass of the total amount of polyether polyol (B1-1) and acrylonitrile used).

Synthesis Example 25: Polymer Polyol (PC1-1)

A 1-liter autoclave equipped with a thermometer, an agitator, a pressure gauge, and a feeder was fully charged with the polyether polyol (C1-2) having a hydroxyl value of 34 mgKOH/g produced in Synthesis Example 23 and was heated to 120° C. while stirring. A liquid mixture of the polyether polyol (C1-2), a radical polymerization initiator, acrylonitrile, and a dispersion stabilizer was continuously added to the autoclave. The graft polymerization of acrylonitrile was performed at a reaction temperature of 120° C., a reaction pressure of 400 kPa, and a residence time of 50 minutes. After the initial fraction was removed from an outlet, a reaction solution was continuously obtained. The amounts of the raw materials were as follows:

Polyether polyol (C1-2): 7800 g (the total amount of polyether polyol (C1-2) contained in the autoclave and the liquid mixture)

Radical polymerization initiator: 80 g

Acrylonitrile: 3000 g

The radical polymerization initiator was as follows:

Radical polymerization initiator: 2,2'-azobis(2-isobutyronitrile)

The resulting reaction solution was heated at 120° C. under a reduced pressure of 655 Pa or less for three hours to remove unreacted acrylonitrile and decomposition products of the radical polymerization initiator, thus yielding a polymer polyol (PC1-1) having a hydroxyl value of 23 mgKOH/g. The polymer polyol (PC1-1) had a vinyl polymer content of 30% by mass (the total amount of acrylonitrile used was 30% by mass based on 100% by mass of the total amount of polyether polyol (C1-2) and acrylonitrile used).

Preparation of Polyurethane Foam

Example 1

A resin premix was prepared by mixing 58 parts of the polyester polyol (A-1) produced in Synthesis Example 1, 30 parts of the low-monool-content polyol (B-1) synthesized in Synthesis Example 21, 12 parts of the polymer polyol (PB1-1) synthesized in Synthesis Example 24, 2.0 parts of a cross-linker Actcol KL-210 (manufactured by Mitsui Chemicals Polyurethane Co., Ltd.), 2.5 parts of a communicating agent Actcol EP-505S (manufactured by Mitsui Chemicals Polyurethane Co., Ltd.), 0.7 parts of a foam stabilizer FV-1013-16 (manufactured by Dow Corning Toray Co., Ltd.), 2.3 parts of water, and 1.2 parts of a catalyst R-9000 (manufactured by Katsuzai Chemicals Co.). The resin premix was mixed with 32 parts of polyisocyanate (manufactured by Mitsui Chemicals Polyurethane Co., Ltd., trade name Cosmonate TM-20, NCO index 1.00) and was immediately injected in a metal mold having inside dimensions of 300 mm×300 mm×100 mm at 60° C. After the metal mold was closed, the mixture was expanded. The metal mold was maintained at 60° C. for eight minutes to allow the curing reaction to proceed. A flexible polyurethane foam was removed from the metal mold. Various physical properties of the foam were measured. Table 4 shows the physical properties of the flexible polyurethane foam.

Examples 2 to 4 and Comparative Examples 1 to 4

Flexible polyurethane foams (Examples 2 to 4 and Comparative Examples 1 to 4) were produced in the same manner as Example 1 except that the amounts of the following raw materials were changed as shown in Table 4: the polyester polyols (A-2 to A-8) produced in Synthesis Examples 2 to 8, the low-monool-content polyol (B-1), the polymer polyol (PB1-1), the cross-linker (Actcol KL-210), the communicating agent (Actcol EP-505S), the foam stabilizer (FV-1013-16), water, the catalyst (R-9000), and the foam stabilizer (trade name Y-10366 manufactured by GE Toshiba Silicones Co., Ltd.). Table 4 shows the physical properties of the flexible polyurethane foam.

Examples 5 to 12 and Comparative Examples 5 to 7

Flexible polyurethane foams (Examples 5 to 12 and Comparative Examples 5 to 7) were produced in the same manner as Example 1 except that the amounts of the following raw materials were changed as shown in Table 5: the polyester polyols (A-9 to A-14, A-16, and A-18) produced in Synthesis Examples 9 to 14, 16, and 18, the low-monool-content polyol (B-1), the polyether polyol (C-1), the polymer polyol (PB1-1), the polymer polyol (PC1-1), the cross-linker (Actcol KL-210), the cross-linker (glycerin manufactured by Wako Pure Chemical Industries, Ltd.), the communicating agent (Actcol EP-505S), the foam stabilizer (FV-1013-16), water, the catalyst (R-9000), a catalyst (dibutyltin dilaurate DBTDL (Neostam U-100 manufactured by Nitto Kasei Co., Ltd.), a catalyst (70% dipropylene glycol solution of bis(2-dimethylaminoethyl) ether: NIAX A-1 manufactured by Momentive Performance Materials Inc.), and the foam stabilizer (Y-10366). Table 5 shows the physical properties of the flexible polyurethane foam.

TABLE 4

| Type of polyester polyol | Example 1<br>Polyol A-1 | Example 2<br>Polyol A-2 | Example 3<br>Polyol A-3 | Example 4<br>Polyol A-4 | Comparative example 1<br>Polyol A-5 |
|---|---|---|---|---|---|
| Fatty acid having hydroxy group and fatty acid ester having hydroxy group | High-purity castor oil fatty acid (1) + castor oil fatty acid | High-purity castor oil fatty acid (1) + castor oil fatty acid | High-purity castor oil fatty acid (3) + castor oil fatty acid | High-purity castor oil fatty acid methyl ester (4) + castor oil fatty acid | Castor oil fatty acid |
| Purity of castor oil fatty acid (ester) (%) | 95 | 95 | 95 | 99 | 86 |
| Purity of 12-hydroxystearic acid (%) | | | | | |
| Proportion of fatty acid having hydroxy group and carbon-carbon double bond (%) | 98 | 98 | 98 | 99 | 99 |
| Polyhydric alcohol | PE450/SOR400 | PE450/SOR400 | PE450/SOR400 | PE450/SOR400 | SOR400 |
| Average number of functional groups of polyhydric alcohol | 4.6 | 5.2 | 5.8 | 4.9 | 6 |
| OHV (mgKOH/g) | 30.9 | 55.2 | 33.3 | 27.5 | 34 |
| Average number of functional groups (calculated) | 3.5 | 4.4 | 4.4 | 4.4 | 3.5 |
| Mass ratio of castor oil fatty acid (per mole of polyhydric alcohol) | 11.1 | 6.5 | 10.5 | 15.2 | 7.7 |
| Amount charged (g) | | | | | |
| Polyisocyanate | 32 | 34 | 32 | 32 | 32 |
| NCO index | 1.00 | 1.00 | 1.00 | 1.00 | 1.00 |
| Type of polyester polyol | Polyol A-1 | Polyol A-2 | Polyol A-3 | Polyol A-4 | Polyol A-5 |
| Polyester polyol | 58 | 58 | 58 | 58 | 58 |
| Polyether polyol B1-1 | 30 | 42 | 30 | 30 | 10 |
| Polymer polyol PB1-1 | 12 | 0 | 12 | 12 | 32 |
| Polyether polyol C1-1 | | | | | |
| Polymer polyol PC1-1 | | | | | |
| KL-210 | 2.0 | 2.0 | 2.0 | 2.0 | 2.0 |
| Glycerin | | | | | |

TABLE 4-continued

|  |  |  |  |  |  |
|---|---|---|---|---|---|
| EP-505S | 2.5 | 2.5 | 2.5 | 2.5 | 2.5 |
| Water | 2.3 | 2.3 | 2.3 | 2.3 | 2.3 |
| Y-10366 | — | 1 | — | 1 | — |
| FV-1013-16 | 0.7 | — | 0.5 | — | 0.5 |
| DBTDL A-1 |  |  |  |  |  |
| R-9000 | 1.2 | 1.2 | 1.2 | 1.2 | 1.2 |
| Dco (kg/cm³) | 60.0 | 60.8 | 59.5 | 59 | 57.6 |
| BR (%) | 60 | 62 | 65 | 65 | 54 |
| 25% ILD (N/314 cm²) | 218 | 263 | 237 | 233 | 220 |
| Elongation (%) | 74 | 63 | 78 | 61 | 78 |
| WS (%) | 12.2 | 7.9 | 8.8 | 10.9 | 9.2 |
| Characteristics balance (hardness, BR, WS) | Good | Good | Good | Good | Poor |

|  |  | Comparative example 2 | Comparative example 3 | Comparative example 4 |
|---|---|---|---|---|
| Type of polyester polyol |  | Polyol A-6 | Polyol A-7 | Polyol A-8 |
|  | Fatty acid having hydroxy group and fatty acid ester having hydroxy group | Castor oil fatty acid | Castor oil fatty acid | High-purity castor oil fatty acid (1) + castor oil fatty acid |
|  | Purity of castor oil fatty acid (ester) (%) | 86 | 86 | 95 |
|  | Purity of 12-hydroxystearic acid (%) |  |  |  |
|  | Proportion of fatty acid having hydroxy group and carbon-carbon double bond (%) | 99 | 99 | 98 |
|  | Polyhydric alcohol | SOR400 | Gly/PE450 | Gly |
|  | Average number of functional groups of polyhydric alcohol | 6 | 3.6 | 3 |
|  | OHV (mgKOH/g) | 53.9 | 59.2 | 57.8 |
|  | Average number of functional groups (calculated) | 4.4 | 2.6 | 2.6 |
|  | Mass ratio of castor oil fatty acid (per mole of polyhydric alcohol) | 5.1 | 6.9 | 26.8 |
|  | Amount charged (g) |  |  |  |
|  | Polyisocyanate | 34 | 34 | 34 |
|  | NCO index | 1.00 | 1.00 | 1.00 |
|  | Type of polyester polyol | Polyol A-6 | Polyol A-7 | Polyol A-8 |
|  | Polyester polyol | 58 | 58 | 58 |
|  | Polyether polyol B1-1 | 30 | 30 | 30 |
|  | Polymer polyol PB1-1 | 12 | 12 | 12 |
|  | Polyether polyol C1-1 |  |  |  |
|  | Polymer polyol PC1-1 |  |  |  |
|  | KL-210 | 2.0 | 2.0 | 2.0 |
|  | Glycerin |  |  |  |
|  | EP-505S | 2.5 | 2.5 | 2.5 |
|  | Water | 2.3 | 2.3 | 2.3 |
|  | Y-10366 | 1 | — | — |
|  | FV-1013-16 | — | 0.7 | 0.7 |
|  | DBTDL A-1 |  |  |  |
|  | R-9000 | 1.2 | 1.2 | 1.2 |
|  | Dco (kg/cm³) | 60.7 | 61.7 | 60.8 |
|  | BR (%) | 56 | 50 | 54 |
|  | 25% ILD (N/314 cm²) | 268 | 207 | 218 |
|  | Elongation (%) | 73 | 62 | 69 |
|  | WS (%) | 8.3 | 6.3 | 7.1 |
|  | Characteristics balance (hardness, BR, WS) | Poor | Poor | Poor |

TABLE 5

| Type of polyester polyol | Example 5 Polyol A-9 | Example 6 Polyol A-10 | Example 7 Polyol A-11 | Example 8 Polyol A-12 | Example 9 Polyol A-13 | Example 10 Polyol A-16 | Example 11 Polyol A-16 |
|---|---|---|---|---|---|---|---|
| Fatty acid having hydroxy group and fatty acid ester having hydroxy group | High-purity castor oil fatty acid (2) + castor oil fatty acid | High-purity castor oil fatty acid (2) + castor oil fatty acid | High-purity castor oil fatty acid (1) + castor oil fatty add | High-purity castor oil fatty acid (3) + castor oil fatty acid | High-purity castor oil fatty acid (1) + castor oil fatty acid + high-purity 12-HSA | High-purity castor oil fatty acid (1) + castor oil fatty acid | High-purity castor oil fatty acid (1) + castor oil fatty acid |
| Purity of castor oil fatty acid (ester) (%) | 90 | 90 | 95 | 97 | 95 | 95 | 95 |
| Purity of 12-hydroystearic acid (%) |  |  |  |  | 91 |  |  |

TABLE 5-continued

| | | | | | | | |
|---|---|---|---|---|---|---|---|
| Proportion of fatty acid having hydroxy group and carbon-carbon double bond (%) | 98 | 98 | 98 | 98 | 49 | 98 | 98 |
| Polyhydric alcohol | PE450/SOR400 | PE450/SOR400 | PE450/SOR400 | PE450/SOR400 | PE450/SOR400 | PE450/SOR400 | PE450/SOR400 |
| Average number of functional groups of polyhydric alcohol | 5.6 | 5.9 | 4.1 | 4.9 | 5.4 | 5.2 | 5.2 |
| OHV (mgKOH/g) | 34.5 | 53.1 | 54.4 | 50.6 | 54.3 | 49.7 | 49.7 |
| Average number of functional groups (calculated) | 3.5 | 4.4 | 3.5 | 4.4 | 4.4 | 4.4 | 4.4 |
| Mass ratio of castor oil fatty acid (per mole of polyhydric alcohol) | 8.0 | 5.3 | 7.2 | 7.0 | 3.0 | 7.2 | 7.2 |
| Amount charged (g) | | | | | | | |
| Polyisocyanate | 33 | 34 | 34 | 34 | 35 | 38 | 38 |
| NCO index | 1.00 | 1.00 | 1.00 | 1.00 | 1.00 | 1.00 | 1.00 |
| Type of polyester polyol | Polyol A-9 | Polyol A-10 | Polyol A-11 | Polyol A-12 | Polyol A-13 | Polyol A-16 | Polyol A-16 |
| Polyester polyol | 58 | 58 | 58 | 58 | 58 | 31 | 31 |
| Polyether polyol B1-1 | 42 | 42 | 30 | 42 | 42 | 54 | |
| Polymer polyol PB1-1 | | | 12 | | | 15 | |
| Polyether polyol C1-1 | | | | | | | 39 |
| Polymer polyol PC1-1 | | | | | | 10 | 30 |
| KL-210 | 1.2 | 2.0 | 2.0 | 2.0 | 1.2 | 1.0 | 1.0 |
| Glycerin | | | | | | 0.5 | 0.5 |
| EP-505S | 2.5 | 2.5 | 2.5 | 2.5 | 2.5 | 2.5 | 2.5 |
| Water | 2.5 | 2.3 | 2.3 | 2.3 | 2.5 | 2.3 | 2.3 |
| Y-10366 | — | — | — | — | — | — | — |
| FV-1013-16 | 12 | 0.5 | 0.7 | 1.0 | 0.7 | 0.8 | 0.7 |
| DBTDL | | | | | | | |
| NIAX A-1 | | | | | | 0.05 | |
| R-9000 | 1.2 | 1.2 | 1.2 | 1.2 | 1.2 | 0.7 | 0.7 |
| Dco (kg/cm$^3$) | 58.5 | 61.3 | 61.4 | 60.2 | 58.7 | 62.2 | 61.2 |
| BR (%) | 60 | 60 | 60 | 63 | 60 | 71 | 64 |
| 25% ILD (N/314 cm$^2$) | 195 | 216 | 279 | 239 | 245 | 227 | 267 |
| Elongation (%) | 72 | 58 | 75 | 54 | 65 | 83 | 86 |
| WS (%) | 10.7 | 9 | 7.7 | 9.2 | 8.6 | 6.3 | 11.2 |
| Characteristics balance (hardness, BR, WS) | Good | Good | Good | Good | Good | Good | Good |

| Type of polyester polyol | Example 12 Polyol A-18 | Comparative example 5 Polyol A-14 | Comparative example 6 Polyol A-6 | Comparative example 7 Polyol A-6 |
|---|---|---|---|---|
| Fatty acid having hydroxy group and fatty acid ester having hydroxy group | High-purity 12-HSA | High-purity castor oil fatty acid (1) + castor oil fatty acid | Castor oil fatty acid | Castor oil fatty acid |
| Purity of castor oil fatty acid (ester) (%) | | 95 | 86 | 86 |
| Purity of 12-hydroystearic acid (%) | 92 | | | |
| Proportion of fatty acid having hydroxy group and carbon-carbon double bond (%) | 0 | 98 | 99 | 99 |
| Polyhydric alcohol | PE450/SOR400 | PE450/SOR400 | SOR400 | SOR400 |
| Average number of functional groups of polyhydric alcohol | 5.6 | 4.7 | 6 | 6 |
| OHV (mgKOH/g) | 52.9 | 12.2 | 53.9 | 53.9 |
| Average number of functional groups (calculated) | 4.4 | 4.5 | 4.4 | 4.4 |
| Mass ratio of castor oil fatty acid (per mole of polyhydric alcohol) | 6.0 | 2.5 | 5.1 | 5.1 |
| Amount charged (g) | | | | |
| Polyisocyanate | 34 | 41 | 38 | 38 |
| NCO index | 1.00 | 1.00 | 1.00 | 1.00 |
| Type of polyester polyol | Polyol A-18 | Polyol A-14 | Polyol A-6 | Polyol A-6 |
| Polyester polyol | 58 | 58 | 31 | 31 |
| Polyether polyol B1-1 | 42 | 42 | 42 | |
| Polymer polyol PB1-1 | | | 27 | |
| Polyether polyol C1-1 | | | | 44 |
| Polymer polyol PC1-1 | | | | 25 |
| KL-210 | 2.0 | 2.0 | 2.0 | 2.0 |
| Glycerin | | | | |
| EP-505S | 2.5 | 2.5 | 2.0 | 2.0 |
| Water | 2.3 | 2.3 | 2.3 | 2.3 |
| Y-10366 | | 0.2 | — | — |
| FV-1013-16 | 0.7 | — | 0.7 | 0.7 |
| DBTDL | | 0.05 | | |
| NIAX A-1 | | | 0.05 | 0.05 |
| R-9000 | 1.2 | 1.2 | 0.7 | 0.7 |
| Dco (kg/cm$^3$) | 61.7 | cannot expanded | 57.7 | 59 |
| BR (%) | 61 | | 59 | 58 |

TABLE 5-continued

| | | | | |
|---|---|---|---|---|
| 25% ILD (N/314 cm²) | 215 | | 237 | 265 |
| Elongation (%) | 73 | | 87 | 96 |
| WS (%) | 8.6 | | 12.8 | 13.1 |
| Characteristics balance (hardness, BR, WS) | Good | Poor | Poor | Poor |

Preparation of Polyurethane Resin

Example 13

A polyol (A-19) at 40° C. and Cosmonate PH (MDI-PH manufactured by Mitsui Chemicals, Inc.) at 50° C. were mixed with an agitator having blades at an NCO index of 1.00 for one minute. After degassing under a reduced pressure for one minute, the mixture was cured at 80° C. for 24 hours in molds for the measurement of physical properties (of a sheet type for the measurement of hardness, 2 mm in thickness×12 mm×32 mm, and of a button type for the measurement of rebound resilience, 11 mm in thickness×28 mm in diameter). After curing, the IR measurement of a sample showed no unreacted NCO remained. Table 6 shows the physical properties of the resulting polyurethane resin.

Examples 14 and 15 and Comparative Examples 8 and 9

Cured samples were produced in the same manner as Example 13 except that the polyols (A-2, A-4, A-7, and A-20) produced in Synthesis Example 2, Synthesis Example 4, Synthesis Example 7, and Synthesis Example 20 were used as shown in Table 6. After curing, the IR measurement of each of the samples showed no unreacted NCO remained. Table 6 shows the physical properties of the resulting polyurethane resin.

TABLE 6

| | Example 13 | Example 14 | Example 15 | Comparative example 8 | Comparative example 9 |
|---|---|---|---|---|---|
| Type of polyester polyol | Polyol A-19 | Polyol A-2 | Polyol A-4 | Polyol A-7 | Polyol A-20 |
| Fatty acid having hydroxy group and fatty acid ester having hydroxy group | High-purity castor oil fatty acid (2) + castor oil fatty acid | High-purity castor oil fatty acid (1) + castor oil fatty acid | High-purity castor oil fatty acid methyl ester (4) + castor oil fatty acid | Castor oil fatty acid | 12-HSA |
| Purity of castor oil fatty acid (ester) (%) | 90 | 95 | 99 | 86 | |
| Purity of 12-hydroxystearic acid (%) | | | | | 86 |
| Proportion of fatty acid (ester) having hydroxy group and carbon-carbon double bond (%) | 98 | 98 | 99 | 99 | 0 |
| Polyhydric alcohol | PE450/SOR400 | PE450/SOR400 | PE450/SOR400 | SOR400 | SOR400 |
| Average number of functional groups of polyhydric alcohol | 5.9 | 5.2 | 4.9 | 6 | 6 |
| OHV (mgKOH/g) | 52.0 | 55.2 | 27.5 | 53.9 | 53.3 |
| Average number of functional groups | 4.4 | 4.4 | 4.4 | 4.4 | 4.2 |
| Mass ratio of castor oil fatty acid (per mole of polyhydric alcohol) | 5.3 | 6.5 | 15.2 | 5.1 | 4.9 |
| Amount charged (g) | | | | | |
| Polyisocyanate (MDI-PH) | 18.6 | 19.6 | 9.8 | 18.3 | 19.0 |
| NCO index | 1.00 | 1.00 | 1.00 | 1.00 | 1.00 |
| Type of polyester polyol | Polyol A-19 | Polyol A-2 | Polyol A-4 | Polyol A-7 | Polyol A-20 |
| Polyester polyol | 160 | 160 | 160 | 160 | 160 |
| Shore A hardness | 51 | 56 | 42 | 46 | 45 |
| Rebound resilience (%) | 69 | 71 | 73 | 67 | 57 |
| Tensile strength Maximum stress (MPa) | 1.1 | 1.2 | 1.0 | 0.6 | 0.9 |
| Tensile strength Maximum elongation (%) | 60.5 | 75.0 | 94.0 | 36.7 | 56.2 |

The invention claimed is:

1. A composition for polyurethane, comprising a polyol (P) containing a polyester polyol (A) and another polyol, a catalyst, and a polyisocyanate, wherein the polyester polyol (A) which has a hydroxy value in the range of 25 to 60 mgKOH/g and that is produced by a condensation of raw materials with a polyhydric alcohol, wherein the raw materials are obtained through purification, and the raw materials contain 90% to 99% by mass of at least one selected from the group consisting of ricinoleic acid, a ricinoleate, 12-hydroxystearic acid and a 12-hydroxystearate, and the polyhydric alcohol has an average number of functional groups 4 to 8, wherein the mass ratio of the polyhydric alcohol to the total amount of ricinoleic acid, a ricinoleate, 12-hydroxystearic acid and a 12-hydroxystearate ranges 1:3.0 to 1:15.2, wherein the polyester polyol (A) accounts for 10% to 58% by mass of the polyol (P)

wherein the polyisocyanate is at least one selected from the group consisting of toluylene diisocyanate, diphenylmethane diisocyanate, and a mixture of toluylene diisocyanate and diphenylmethane diisocyanate and wherein the NCO index, which refers to a value calculated by dividing the total number of isocyanate groups of the polyisocyanate by the total number of active hydrogen atoms reactive with the isocyanate group, ranges from 0.70 to 1.30.

2. A composition for polyurethane, comprising a polyol (P) containing a polyester polyol (A) and another polyol, a catalyst, and a polyisocyanate, wherein the polyester polyol (A) which has a hydroxy value in the range of 25 to 60 mgKOH/g and that is produced by a condensation of raw materials with a polyhydric alcohol, wherein the raw materials are obtained through purification, and the polyhydric alcohol has an average number of functional groups 4 to 8, and further wherein 90% to 99% by mass of the raw materials are (I), (II), or (III), wherein:
(I) is ricinoleic acid or 12-hydroxystearic acid
(II) is a ricinoleate or a 12-hydroxystearate, or
(III) is a mixture of (I) and (II), and
wherein the mass ratio of the polyhydric alcohol to the total amount of ricinoleic acid, a ricinoleate, 12-hydroxystearic acid and a 12-hydroxystearate ranges 1:3.0 to 1:15.2,
wherein the polyester polyol (A) accounts for 10% to 58% by mass of the polyol (P),
wherein the polyisocyanate is at least one selected from the group consisting of toluylene diisocyanate, diphenylmethane diisocyanate, and a mixture of toluylene diisocyanate and diphenylmethane diisocyanate and
wherein the NCO index, which refers to a value calculated by dividing the total number of isocyanate groups of the polyisocyanate by the total number of active hydrogen atoms reactive with the isocyanate group, ranges from 0.70 to 1.30.

3. A composition for polyurethane foam, comprising the composition for polyurethane according to claim 1, a foam stabilizer, and a blowing agent.

4. A composition for polyurethane foam, comprising the composition for polyurethane according to claim 2, a foam stabilizer, and a blowing agent.

5. The composition for polyurethane according to claim 1, wherein the polyol (P) further comprises a low-monool-content polyol (B) having a total degree of unsaturation of 0.035 meq/g or less.

6. The composition for polyurethane according to claim 2, wherein the polyol (P) further comprises a low-monool-content polyol (B) having a total degree of unsaturation of 0.035 meq/g or less.

7. The composition for polyurethane foam according to claim 3, wherein the polyol (P) further comprises a low-monool-content polyol (B) having a total degree of unsaturation of 0.035 meq/g or less.

8. The composition for polyurethane foam according to claim 4, wherein the polyol (P) further comprises a low-monool-content polyol (B) having a total degree of unsaturation of 0.035 meq/g or less.

9. A polyurethane resin produced by a reaction of a composition for polyurethane according to claim 1.

10. A polyurethane resin produced by a reaction of a composition for polyurethane according to claim 2.

11. A polyurethane foam produced by a reaction of a composition for polyurethane foam according to claim 3.

12. A polyurethane foam produced by a reaction of a composition for polyurethane foam according to claim 4.

13. The composition for polyurethane according to claim 1,
wherein the fatty acids having a hydroxy group and/or the fatty acid esters having a hydroxy group are derived from castor oil.

14. The composition for polyurethane according to claim 2,
wherein the fatty acids having a hydroxy group and/or the fatty acid esters having a hydroxy group are derived from castor oil.

15. The composition for polyurethane according to claim 1,
wherein the fatty acid having a hydroxy group is ricinoleic acid, and
the fatty acid ester having a hydroxy group is a ricinoleate.

16. The composition for polyurethane according to claim 2,
wherein the fatty acid having a hydroxy group is ricinoleic acid, and
the fatty acid ester having a hydroxy group is a ricinoleate.

17. The composition for polyurethane according to claim 1,
wherein the mass ratio of the polyhydric alcohol to the total amount of the fatty acid having a hydroxy group and the fatty acid ester having a hydroxy group ranges from 1:1 to 1:100.

18. The composition for polyurethane according to claim 2,
wherein the mass ratio of the polyhydric alcohol to the total amount of the fatty acid having a hydroxy group and the fatty acid ester having a hydroxy group ranges from 1:1 to 1:100.

* * * * *